United States Patent
Nishimura

(10) Patent No.: US 8,717,891 B2
(45) Date of Patent: May 6, 2014

(54) SHAPING APPARATUS AND METHOD

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 159 days.

(21) Appl. No.: 13/188,754

(22) Filed: Jul. 22, 2011

(65) Prior Publication Data
US 2012/0051372 A1 Mar. 1, 2012

(30) Foreign Application Priority Data

Aug. 30, 2010 (JP) ................................ 2010-192103
Nov. 22, 2010 (JP) ................................ 2010-260289

(51) Int. Cl.
*H04L 12/28* (2006.01)
*G01R 31/08* (2006.01)

(52) U.S. Cl.
USPC .......................................... 370/232; 370/412

(58) Field of Classification Search
CPC ...... G01R 31/08; H04L 47/22; H04L 49/901; H04L 49/9027; H04L 49/9047
USPC ......... 370/230, 231, 232, 410, 411, 412, 468, 370/419, 420, 395.1
See application file for complete search history.

(56) References Cited

U.S. PATENT DOCUMENTS

| | | | |
|---|---|---|---|
| 2001/0008530 A1 | 7/2001 | Okamoto | |
| 2002/0071387 A1* | 6/2002 | Horiguchi et al. | 370/229 |
| 2006/0268719 A1* | 11/2006 | Takase et al. | 370/235.1 |
| 2008/0151922 A1* | 6/2008 | Elzur et al. | 370/412 |
| 2009/0022053 A1* | 1/2009 | Aimoto et al. | 370/230 |

FOREIGN PATENT DOCUMENTS

| | | |
|---|---|---|
| JP | 2001-203702 | 7/2001 |
| JP | 2006-197235 | 7/2006 |

* cited by examiner

*Primary Examiner* — Hanh N Nguyen
(74) *Attorney, Agent, or Firm* — Staas & Halsey LLP

(57) ABSTRACT

A shaping apparatus includes a plurality of buffers that are set with a writable upper limit size and a buffer where a read processing is carried out is switched every predetermined time. A flow information table includes specific information for specifying a buffer in which input data should be written for each of flows of the input data, maximum amount information indicating a maximum data amount writable in each of the plurality of buffers for each of the flows, and remaining amount information indicating a remaining data amount writable in the buffer specified by the specific information for each of the flows. A shaper writes the input data in the buffer specified by the specific information among the plurality of buffers for each of the flows.

15 Claims, 19 Drawing Sheets

| FLOW ID | INPUT-ACCEPTABLE UPPER LIMIT BYTE COUNT [byte] | EXCUSABLE DELAY [msec] | NEXT TIME BUFFER NUMBER | INPUT-ACCEPTABLE REMAINING BYTE COUNT [byte] |
|---|---|---|---|---|
| #1 | 1250 | 30 | TB1 | 500 |
| #2 | 500 | 50 | TB1 | 300 |
| ⋮ | ⋮ | ⋮ | ⋮ | ⋮ |
| #m | 2000 | 10 | TB3 | 1520 |

| TIME BUFFER IDENTIFICATION NUMBER | BUFFER UPPER LIMIT VALUE [byte] | QUEUE LENGTH [byte] | READING OUT FLAG |
|---|---|---|---|
| TB1 | 125000 | 87000 | 1 |
| TB2 | 125000 | 42000 | 0 |
| ⋮ | ⋮ | ⋮ | ⋮ |
| TBn | 125000 | 0 | 0 |

FIG. 10

| FLOW ID | CLASS ID | INPUT-ACCEPTABLE UPPER LIMIT BYTE COUNT [byte] | EXCUSABLE DELAY [msec] | NEXT TIME BUFFER NUMBER | INPUT-ACCEPTABLE REMAINING BYTE COUNT [byte] |
|---|---|---|---|---|---|
| #1 | 1 | 300 | 30 | TB1 | 100 |
|  | 2 | 500 | 30 | ... | ... |
|  | ⋮ | ⋮ | ⋮ | ⋮ | ⋮ |
|  | b | 2000 | 30 | TB3 | 1520 |
| #2 | 1 | 300 | 10 | TB1 | 100 |
|  | 2 | 500 | 20 | ... | ... |
|  | ⋮ | ⋮ | ⋮ | ⋮ | ⋮ |
|  | b | 2000 | 50 | TB3 | 1520 |
| ⋮ | ⋮ | ⋮ | ⋮ | ⋮ | ⋮ |
| #n | 1 | 300 | 5 | TB1 | 100 |
|  | 2 | 500 | 10 | ... | ... |
|  | ⋮ | ⋮ | ⋮ | ⋮ | ⋮ |
|  | b | 2000 | 10 | TB3 | 1520 |

| TIME BUFFER IDENTIFICATION NUMBER | CLASS ID | BUFFER UPPER LIMIT VALUE [byte] | CLASS UPPER LIMIT VALUE [byte] | CLASS QUEUE LENGTH [byte] | ADDITION CLASS | DETERMINATION QUEUE LENGTH | READING OUT FLAG |
|---|---|---|---|---|---|---|---|
| TB1 | 1 | 125000 | 70000 | 3400 | 1 | 3400 | 1 |
|  | 2 |  | 100000 | 12000 | 1,2 | 15400 |  |
|  | ⋮ |  | ⋮ | ⋮ | ⋮ | ⋮ |  |
|  | B |  | 125000 | 117800 | 1,2,⋯,a | 143500 |  |
| TB2 | 1 | 106500 | 70000 | 6500 | 1 | 6500 | 0 |
|  | 2 |  | 100000 | 8000 | 1,2 | 14500 |  |
|  | ⋮ |  | ⋮ | ⋮ | ⋮ | ⋮ |  |
|  | B |  | 106500 | 56000 | 1,2,⋯,a | 96000 |  |
| ⋮ | ⋮ | ⋮ | ⋮ | ⋮ | ⋮ | ⋮ | ⋮ |
| TBn | 1 | 125000 | 70000 | 0 | 1 | 0 | 0 |
|  | 2 |  | 100000 | 0 | 1,2 | 0 |  |
|  | ⋮ |  | ⋮ | ⋮ | ⋮ | ⋮ |  |
|  | B |  | 125000 | 0 | 1,2,⋯,a | 0 |  |

FIG. 15

| FLOW ID | RATE INFORMATION | INPUT-ACCEPTABLE UPPER LIMIT BYTE COUNT [byte] | EXCUSABLE DELAY [msec] | NEXT TIME BUFFER NUMBER | INPUT-ACCEPTABLE REMAINING BYTE COUNT [byte] |
|---|---|---|---|---|---|
| #1 | (HIGH) | 300 | 30 | TB1 | 0 |
| | (LOW) | 500 | | | 200 |
| #2 | (HIGH) | 1250 | 20 | TB3 | 620 |
| | (LOW) | 0 | | | 0 |
| #3 | (HIGH) | 600 | 30 | : | 600 |
| | (LOW) | 500 | | | 500 |
| : | : | : | : | : | : |
| #m | (HIGH) | 0 | 50 | TB5 | 0 |
| | (LOW) | 700 | | | 500 |

| TIME BUFFER IDENTIFICATION NUMBER | BUFFER THRESHOLD [byte] | QUEUE LENGTH [byte] | READING OUT FLAG |
|---|---|---|---|
| TB1 | 125000 | 150000 | 1 |
| TB2 | 100000 | 35000 | 0 |
| TB3 | 100000 | 2000 | 0 |
| ⋮ | ⋮ | ⋮ | ⋮ |
| TBn | 125000 | 0 | 0 |

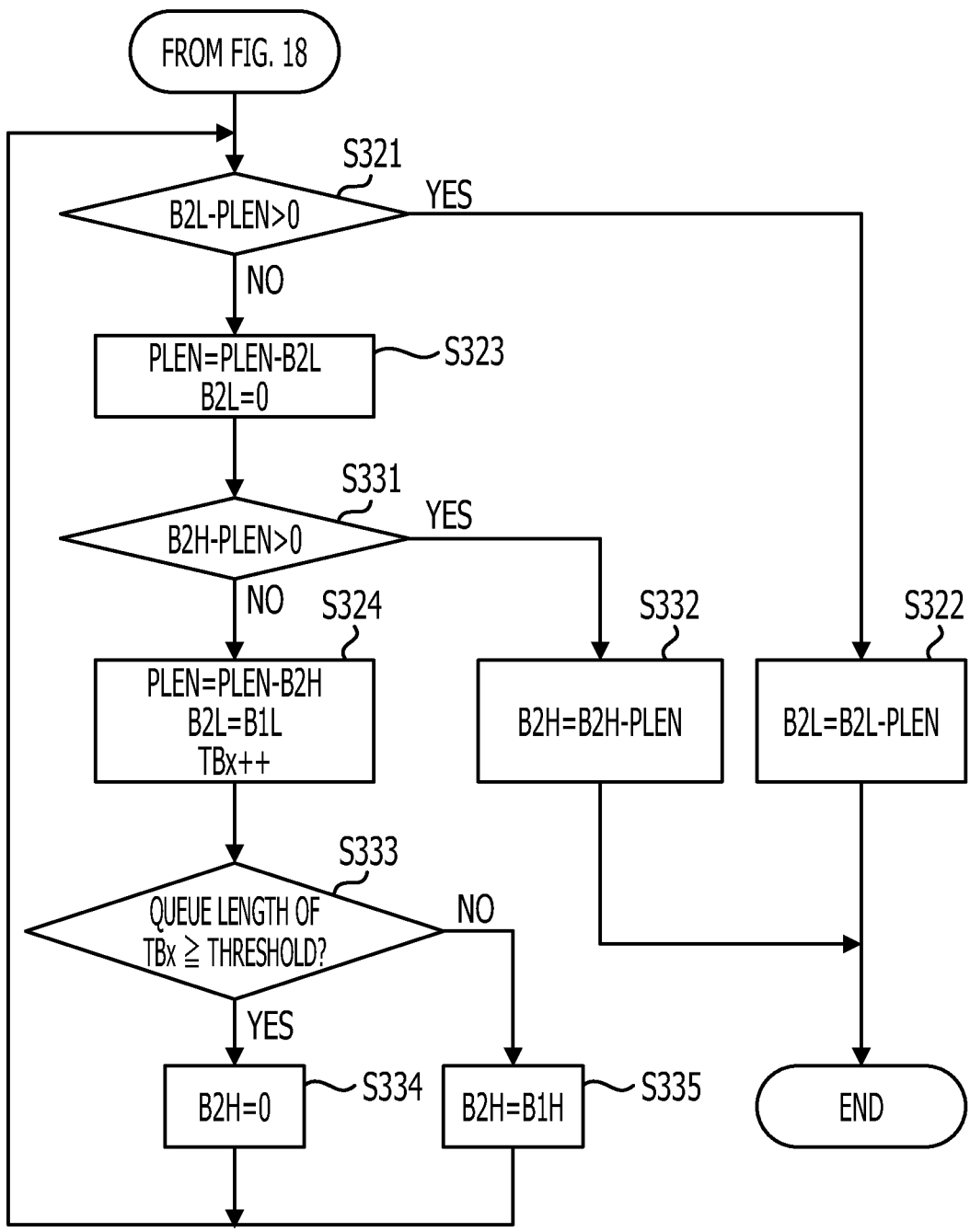

SHAPING APPARATUS AND METHOD

CROSS-REFERENCE TO RELATED APPLICATIONS

This application is based upon and claims the benefit of priority of the prior Japanese Patent Application No. 2010-192103, filed on Aug. 30, 2010, and the Japanese Patent Application No. 2010-260289, filed on Nov. 22, 2010, the entire contents of which are incorporated herein by reference.

FIELD

The embodiments discussed herein are related to a shaping apparatus and method for performing a shaping on data such as, for example, a packet.

BACKGROUND

Along with a wide use of an intranet, the internet, or the like, network traffic is significantly increased. Therefore, a capability of efficiently transferring various types of data having large amounts is important. As a technology for efficiently transferring the various types of data having the large amounts, a shaping apparatus that limits a packet whose transmission is requested (or, other various types of data) to a specified band (rate) and performs a smoothing thereon to output the packet is used.

For example, as the shaping apparatus, an output scheduling type shaping apparatus that performs a scheduling (that is, band limiting) when the packet is output from the shaping apparatus is proposed. An example of the output scheduling type shaping apparatus includes a traffic shaping apparatus using a token bucket model. In the token bucket model, tokens are accumulated in a token bucket at a rate in accordance with a desired band. In a case where a read request on the packets written in a buffer is issued, the size of the packet whose read is requested is compared with a current token amount accumulated in the token bucket. In a case where the token amount is smaller than the size of the packet whose read is requested, the packet is not read until the token amount becomes larger than or equal to the size of the packet whose read is requested. On the other hand, if the token amount is larger than or equal to the size of the packet whose read is requested, the packet is read, and also the tokens are deleted by the amount corresponding to the size of the packet from the tokens accumulated in the token bucket.

In the output scheduling type shaping apparatus, in a case where packet read requests are issued from a plurality of buffers at once, while following a predetermined rule (for example, round-robin, strict priority queuing, or the like), the buffer where a read processing is actually performed is sequentially selected one by one. In the buffer where the timing for performing the read processing is delayed, the tokens are accumulated also while waiting for the read processing, and the delay in the timing for performing the read processing can be retrieved later. However, in a case where the read requests are issued from too many buffers at the same time, the tokens accumulated in the token bucket while waiting for the read processing may exceed the size of the token bucket. Therefore, the accumulation of the tokens discontinues, which leads to a decrease in throughput as a result.

In view of the above, Japanese Unexamined Patent Application Publication No. 2006-197235 discloses an input scheduling type shaping apparatus that performs a scheduling when the packet is input to the shaping apparatus. For example, the input scheduling type shaping apparatus is provided with a buffer unit that stores the input packet and a time table that is notched in time slots of a fixed size (to be specific, 64 bytes that is the minimum packet length for ETHERNET). The shaping apparatus calculates an ideal output ending time for a new input packet on the basis of a previous packet output ending time and a desired transmission rate and also enters the new input packet to the next time slot after the previous packet output ending time. By adjusting an interval of the time slots in which the packet is entered, an appropriate shaping is realized. For example, in a case where an attention is paid on a certain one flow, when a packet having a large size arrives, a packet arriving next is entered in a further later time slot, and when a packet having a small size arrives, a packet arriving next is entered in a further nearer time slot.

SUMMARY

According to an aspect of the embodiment, a shaping apparatus includes a plurality of buffers in which a data amount that can be read out within a predetermined time is set as a writable upper limit size and a buffer where a read processing is carried out is sequentially switched every predetermined time, a flow information table including specific information for specifying a buffer in which input data should be written for each of flows of the input data, maximum amount information indicating a maximum data amount writable in each of the plurality of buffers for each of the flows, and remaining amount information indicating a remaining data amount writable in the buffer specified by the specific information for each of the flows, and a shaper that writes the input data in the buffer specified by the specific information among the plurality of buffers for each of the flows, wherein for each of the flows, the shaper updates the remaining amount information to a value obtained by subtracting a newly written data amount of the input data from the remaining amount information before the input data is written and repeatedly performs, in a case where the remaining amount information after the update takes a negative value, each of an operation of updating the specific information to information for specifying another buffer in a next or subsequent stage of the buffer specified by the specific information and an operation of adding the maximum amount information to the remaining amount information each time the specific information is updated until the remaining amount information takes a positive value.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a table diagram of a data structure of a flow information table according to the first embodiment;

FIG. 4 is a table diagram of a data structure of a buffer management table according to the first embodiment;

FIG. 10 is a table diagram of a data structure of a flow information table according to the second embodiment;

FIG. 11 is a table diagram of a data structure of a buffer management table according to the second embodiment;

FIG. 15 is a table diagram of a data structure of a flow information table used in a modified operation example;

FIG. 16 is a table diagram of a data structure of a buffer management table used in the modified operation example;

FIG. 19 is a flow chart illustrating a flow of another part of the modified operation example by the packet shaping apparatus according to the second embodiment.

DETAILED DESCRIPTION OF EMBODIMENT(S)

Figure 1:
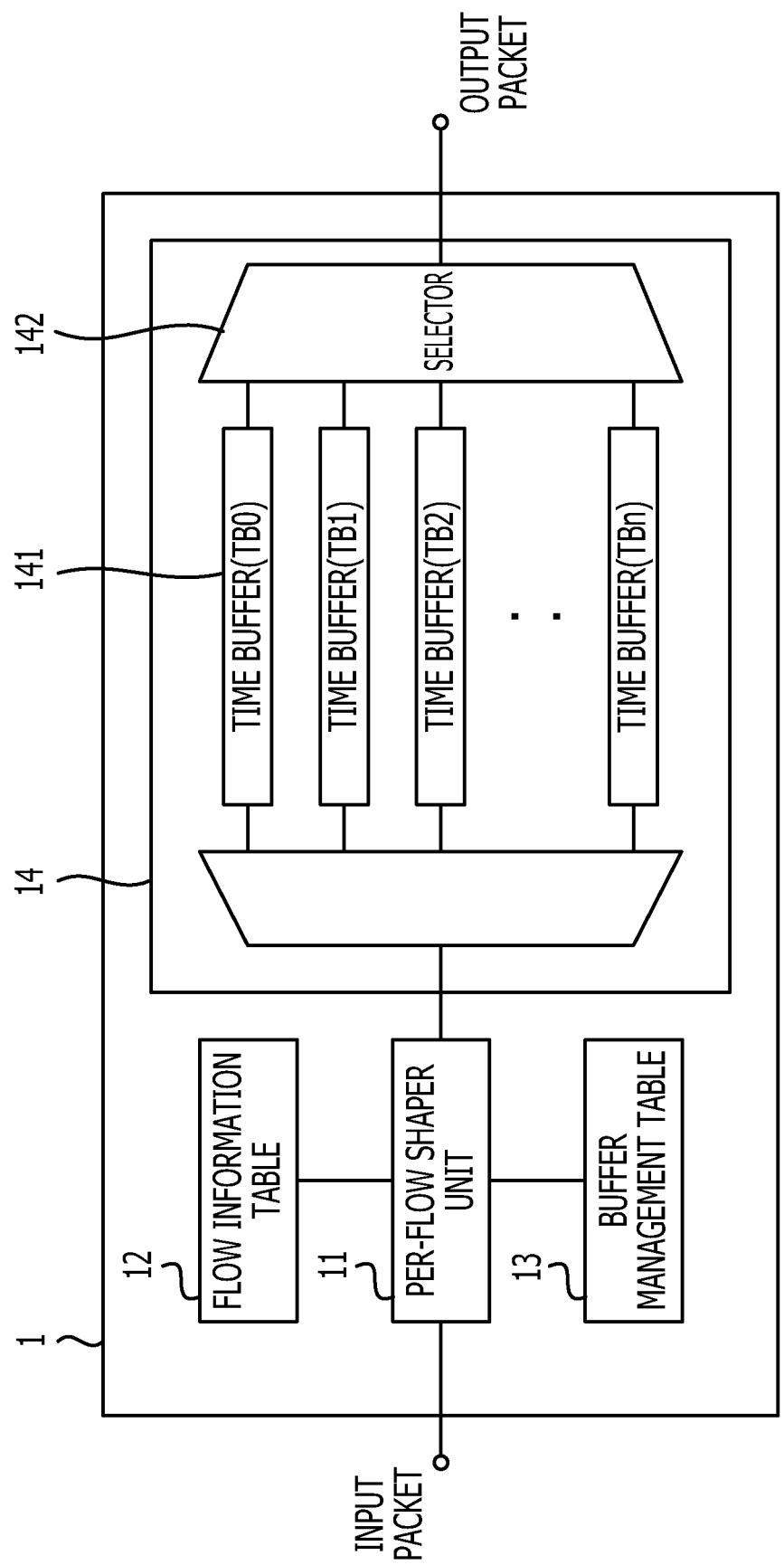
FIG. 1 is a block diagram of an exemplary function block of a packet shaping apparatus according to a first embodiment.

However, in the above-mentioned input scheduling type shaping apparatus, a unit of the time slot on the time table is fixed to the minimum packet length (64 bytes). Therefore, depending on a transmission capacity of a network, it is necessary to prepare an enormous number of time slots. For example, to prepare a time table having a 50 millisecond time width on a network with a transmission capacity of 1 Gbps, it is necessary to use approximately 100000 pieces of time slots. When the 100000 pieces of time slots are to be realized with a RAM or the like, 100000 pieces (100 k pieces) of addresses are needed, and therefore an extremely large-scale implementation is needed.

In addition, as the unit of the time slot is fixed to the minimum packet length (64 bytes), for example, depending on a size of an input packet, the decrease in the throughput may be caused. For example, in a case where an input packet having 65 bytes is input, the input packet is entered in two time slots, and also a next input packet after the input packet is entered in a next time slot after the relevant two time slots. Therefore, as the input packet having 65 bytes is entered into the time slots having 128 bytes, the decrease in the throughput is caused.

In this way, it does not necessarily mean that an efficient shaping can be carried out in the above-mentioned input scheduling type shaping apparatus.

The above-mentioned problem is exemplified as an example of problems to be solved by the present invention. According to embodiments of the present invention, for example, it is desirable to provide a shaping apparatus capable of performing an efficient shaping and a shaping method.

The above-mentioned problem may be solved by a shaping apparatus including a plurality of buffers, a flow (data stream) information table, and a shaper. In the plurality of buffers, a data amount that can be read out within a predetermined time is set as a writable upper limit size. When input data written in the plurality of buffers is read out, a buffer where the read processing is carried out is sequentially switched every predetermined time. The flow information table includes specific information, maximum amount information, and remaining amount information. The specific information specifies a buffer in which the input data should be written for each of flows of the input data. The maximum amount information indicates a maximum data amount writable in each of the plurality of buffers for each of the flows. The remaining amount information indicates a remaining data amount writable in the buffer specified by the specific information for each of the flows. The shaper writes the input data in the buffer specified by the specific information among the plurality of buffers for each of the flows of the input data. Furthermore, the shaper updates the remaining amount information to a value obtained by subtracting a newly written data amount of the input data from the remaining amount information before the input data is written for each of the flows. In addition, in a case where the remaining amount information after the update takes a negative value, the shaper repeatedly performs each of an operation of updating the specific information to information for specifying another buffer in a next or subsequent stage of the buffer specified by the specific information and an operation of adding the maximum amount information to the remaining amount information each time the specific information is updated until the remaining amount information takes a positive value.

The above-mentioned problem may be solved by a shaping method for the shaping apparatus including the above-mentioned plurality of buffers and the above-mentioned flow information table, the shaping method including a write step and an update step. In the write step, the input data is written in the buffer specified by the specific information among the plurality of buffers. In the update step, for each of the flows, the remaining amount information is updated to a value obtained by subtracting a newly written data amount of the input data from the remaining amount information before the input data is written. In the update step, in a case where the remaining amount information after the update takes a negative value, both an operation of updating the specific information to information for specifying another buffer in a next or subsequent stage of the buffer specified by the specific information and an operation of adding the maximum amount information to the remaining amount information each time the specific information is updated are repeatedly carried out until the remaining amount information takes a positive value.

According to the shaping apparatus and method described above, while the flow information table is updated, the write of the input data into the plurality of buffers is carried out. Therefore, it is possible to carry out the efficient shaping.

Hereinafter, embodiments for carrying out the present invention will be described on the basis of the drawings. It should be noted that hereinafter, a description will be made on a packet shaping apparatus that is an example of a shaping apparatus. It should be noted that a configuration and an operation which will be described below may also be applied to an arbitrary shaping apparatus that shapes various pieces of data other than the packet (for example, such as a cell and a frame).

(1) First Embodiment

With reference to FIG. 1 to FIG. 8, a description will be made on a packet shaping apparatus 1 according to a first embodiment.

(1-1) Configuration of Packet Shaping Apparatus

Figure 2:
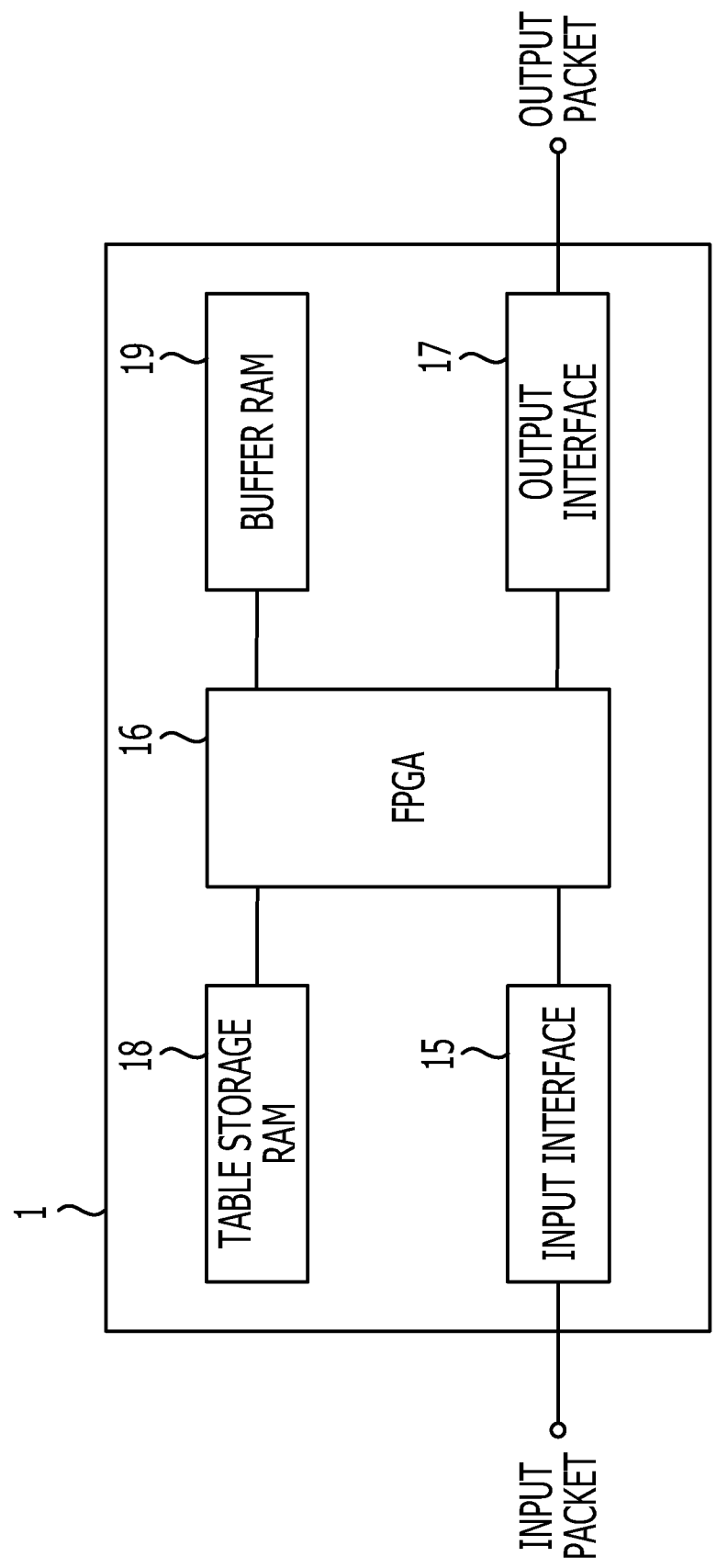
FIG. 2 is a block diagram of an exemplary hardware block of the packet shaping apparatus according to the first embodiment.

With reference to FIG. 1 and FIG. 2, a description will be made on a configuration of the packet shaping apparatus 1 according to the first embodiment. FIG. 1 is a block diagram of an exemplary function block of the packet shaping apparatus 1 according to the first embodiment. FIG. 2 is a block diagram of an exemplary hardware block of the packet shaping apparatus 1 according to the first embodiment.

As illustrated in FIG. 1, the packet shaping apparatus 1 according to the first embodiment is provided with a per-flow shaper unit 11, a flow information table 12, a buffer management table 13, and a buffer unit 14.

The per-flow shaper unit 11 writes an input packet input to the packet shaping apparatus 1 in one of n (where n is an integer larger than or equal to 1) pieces of time buffers (TBk (where k an integer satisfying 1≤k≤n) 141 provided to the buffer unit 14. On the basis of at least one of the flow information table 12 and the buffer management table 13, the per-flow shaper unit 11 preferably decides at least one buffer 141 in which the input packet should be written among the n pieces of time buffers (TBk) 141.

The flow information table 12 is a table including information related to a flow of the input packet. In the flow of the input packet, for example, the input packet is individually allocated in accordance with a transmission or reception contractor, a service for the input packet, and the like. It should be noted that a detail of the flow information table 12 will be described in detail later with reference to FIG. 3, and therefore a detailed description herein will be omitted.

The buffer management table 13 is a table including information for managing the n pieces of time buffers (TBk) 141. It should be noted that a detail of the buffer management table 13 will be described in detail later with reference to FIG. 4, and therefore a detailed description herein will be omitted.

The buffer unit 14 is provided with the n pieces of time buffers (TBk) 141 and a selector 142.

Each of the n pieces of time buffers (TBk) 141 temporarily stores the input packet written by the per-flow shaper unit 11. An upper limit size of each of the n pieces of time buffers (TBk) 141 (that is, a writable upper limit size, and an upper limit size of a buffering capacity) is set as a maximum data amount that can be read out from the respective time buffers (TBk) 141 within a predetermined time T1. For example, in a case where the predetermined time T1 is set as 1 millisecond, the upper limit size of each of the n pieces of time buffers (TBk) 141 is set as a maximum data amount that can be read out from the respective time buffers (TBk) 141 within 1 millisecond. It should be however noted that the upper limit size of each of the n pieces of time buffers (TBk) 141 may be set as a value obtained by adding a predetermined margin (for example, a margin of a size equivalent to 1 packet) to the maximum data amount that can be read out from the respective time buffers (TBk) 141 within the predetermined time T1.

It should be noted that according to the first embodiment, a symbol "TBk" assigned to each of the n pieces of time buffers (TBk) 141 may also be used as an identification number of the time buffer (TBk) 141 for convenience sake. In addition, the notation "TBk" may also be used as information indicating an order where the input packets written in the time buffer (TBk) 141 are read out for convenience sake. In this case, for example, a time buffer (TB1) 141 is the time buffer (TB1) 141 having an identification number "TB1" and the time buffer (TB1) 141 read out in the first place (or next to an n-th time buffer (TBn) 141). Similarly, for example, a time buffer (TB2) 141 is the time buffer (TB2) 141 having an identification number "TB2" and is the time buffer (TB2) 141 read out in the second place (that is, next to the first time buffer (TB1) 141). Similarly, for example, the time buffer (TBk) 141 is the time buffer (TBk) 141 having an identification number "TBk" and the time buffer (TBk) 141 read out in the k-th place (that is, next to a (k−1)-th time buffer (TBk−1) 141).

The selector 142 sequentially selects one time buffer (TBk) 141 from which the input packet is read out among the input packets written in the n pieces of time buffers (TBk) 141 every predetermined times T1. It should be noted that as described above, the selector 142 preferably selects the time buffers from the time buffer (TB1) 141 to the time buffer (TBn) in this order. While the predetermined time T1 elapses, the selector 142 reads out the input packet written in the selected one time buffer (TBk) 141 as an output packet. To elaborate, the one time buffer (TBk) 141 from which the input is read out as the output packet is sequentially switched by the selector 142 every predetermined times T1.

As illustrated in FIG. 2, from a viewpoint of the hardware configuration, the packet shaping apparatus 1 is provided with an input interface 15, an FPGA (Field Programmable Gate Array) 16, an output interface 17, a table storage RAM (Random Access Memory) 18, and a buffer RAM 19. The input interface 15 accepts an input of the input packet. The FPGA 16 is an integrated processing circuit including a rewritable logic circuit and can carry out a definition or a design of the logic circuit so that a processing in accordance with a specification of the shaping apparatus 1 is performed. The output interface 17 outputs the output packet. The table storage RAM 18 is a RAM for storing the flow information table 12 and the buffer management table 13. The buffer RAM 19 is a RAM for forming a plurality of time buffers 141. It should be noted that the FPGA 16 corresponds to the per-flow shaper unit 11 and the selector 142 described above. The table storage RAM 18 corresponds to the flow information table 12 and the buffer management table 13 described above. The buffer RAM 19 corresponds to the above-mentioned plurality of time buffers 141.

(1-2) Data Structures of Flow Information Table and Buffer Management Table

With reference to FIG. 3 and FIG. 4, a description will be made on data structures of the flow information table 12 and the buffer management table 13 according to the first embodiment. FIG. 3 is a table diagram of the data structure of the flow information table 12 according to the first embodiment. FIG. 4 is a table diagram of the data structure of the buffer management table 13 according to the first embodiment.

As illustrated in FIG. 3, the flow information table 12 is provided with a flow information record 126 including a flow ID 121, an input-acceptable upper limit byte count 122, an excusable delay 123, a next time buffer number 124, and an input-acceptable remaining byte count 125 for each of the flows. It should be noted that FIG. 3 illustrates an example of the flow information table 12 in which m (where m is an integer larger than or equal to 1) pieces of flows exist.

The flow ID 121 represents identification information (ID) for identifying a flow corresponding to the flow information record 126. It should be noted that FIG. 3 represents an example in which the flow IDs 121 like "#1", "#2", . . . , "#m" are allocated to the m pieces of flows.

The input-acceptable upper limit byte count 122 is an example of "maximum amount information" and represents an upper limit byte count that can be written in the respective time buffers (TBk) 141 for each of the flows. To elaborate, the input-acceptable upper limit byte count 122 represents an upper limit byte count of the input packets for the respective flows that can be written in the respective time buffers (TBk) 141. For example, FIG. 3 illustrates an example of the input-acceptable upper limit byte count 122 which represents that the input packet in the flow where the flow ID 121 becomes "#1" can be written in the respective time buffers (TBk) 141 up to 1250 bytes. Similarly, for example, FIG. 3 illustrates an example of the input-acceptable upper limit byte count 122 which represents that the input packet in the flow where the flow ID 121 becomes "#2" can be written in the respective time buffers (TBk) 141 up to 500 bytes. Similarly, for example, FIG. 3 illustrates an example of the input-acceptable upper limit byte count 122 which represents that the input packet in the flow where the flow ID 121 becomes "#m" can be written in the respective time buffers (TBk) 141 up to 2000 bytes. It should be noted that in the input-acceptable upper limit byte count 122, a fixed byte count may also be set in accordance with a band (rate) of the respective flows. Alternatively, the input-acceptable upper limit byte count 122 may also be appropriately changed.

The excusable delay 123 is an example of "delay time information" and represents an acceptable value of the delay time from a time when the input packet is newly written until a time when the relevant input packet is actually read out. To be more specific, with a starting point of the one time buffer (TBk) 141 currently read out, the excusable delay 123 represents an acceptable value of the delay time until the relevant written input packet is actually read out from another time buffer (TBk) 141 in which the input packet should be newly written. For example, the delay time from a time when the input packet is newly written until a time when the relevant input packet is actually read out is within the excusable delay 123, it is preferable that the input packet is actually written in. On the other hand, for example, if the delay time from a time when the input packet is newly written until a time when the relevant input packet is actually read out exceeds the excusable delay 123, it is preferable that the input packet is not actually newly written in.

It should be noted that FIG. 3 illustrates an example in which the excusable delay 123 in the flow where the flow ID 121 becomes "#1" is 30 milliseconds. Therefore, if the delay time from a time when the input packet is written and until a time when the input packet is actually read out is smaller than or equal to 30 milliseconds, it is preferable that the input packet in the flow where the flow ID 121 becomes "#1" is written in one of the n pieces of time buffers (TBk) 141. On the other hand, if the delay time from a time when the input packet is written and until a time when the input packet is actually read out exceeds 30 milliseconds, it is preferable that the input packet in the flow where the flow ID 121 becomes "#1" is not written in any of the n pieces of time buffers (TBk) 141 (for example, discarded).

Similarly, FIG. 3 illustrates an example in which the excusable delay 123 in the flow where the flow ID 121 becomes "#2" is 50 milliseconds. Therefore, if the delay time from a time when the input packet is written and until a time when the input packet is actually read out is smaller than or equal to 50 milliseconds, it is preferable that the input packet in the flow where the flow ID 121 becomes "#2" is written in one of the n pieces of time buffers (TBk) 141. On the other hand, if the delay time from a time when the input packet is written and until a time when the input packet is actually read out exceeds 50 milliseconds, it is preferable that the input packet in the flow where the flow ID 121 becomes "#2" is not written in any of the n pieces of time buffers (TBk) 141 (for example, discarded).

Similarly, FIG. 3 illustrates an example in which the excusable delay 123 in the flow where the flow ID 121 becomes "#m" is 10 milliseconds. Therefore, if the delay time from a time when the input packet is written and until a time when the input packet is actually read out is smaller than or equal to 10 milliseconds, it is preferable that the input packet in the flow where the flow ID 121 becomes "#m" is written in one of the n pieces of time buffers (TBk) 141. On the other hand, if the delay time from a time when the input packet is written and until a time when the input packet is actually read out exceeds 10 milliseconds, it is preferable that the input packet in the flow where the flow ID 121 becomes "#m" is not written in any of the n pieces of time buffers (TBk) 141 (for example, discarded).

The next time buffer number 124 is an example of "specific information" and represents an identification number of one time buffer (TBk) 141 in which the input packet should be written for each of the flows. For example, FIG. 3 illustrates an example of the next time buffer number 124 which represents that the input packet in the flow where the flow ID 121 becomes "#1" should be written in the time buffer (TB1) 141. Similarly, for example, FIG. 3 illustrates an example of the next time buffer number 124 which represents that the input packet in the flow where the flow ID 121 becomes "#2" should be written in the time buffer (TB1) 141. Similarly, for example, FIG. 3 illustrates an example of the next time buffer number 124 which represents that the input packet in the flow where the flow ID 121 becomes "#m" should be written in a time buffer (TB3) 141.

The input-acceptable remaining byte count 125 is an example of "remaining amount information" and represents a byte count that can be written in the one time buffer (TBk) 141 specified by the next time buffer number 124 individually for each of the flows. For example, the input-acceptable remaining byte count 125 becomes a value obtained by subtracting the byte count of the input packet already written in the one time buffer (TBk) 141 specified by the next time buffer number 124 from the above-mentioned input-acceptable upper limit byte count 122. For example, FIG. 3 illustrates an example of the input-acceptable remaining byte count 125 which represents that the input packet in the flow where the flow ID 121 becomes "#1" can be written in the time buffer (TB1) 141 specified by the next time buffer number 124 still up to 500 bytes remaining. Similarly, for example, FIG. 3 illustrates an example of the input-acceptable remaining byte count 125 which represents that the input packet in the flow where the flow ID 121 becomes "#2" can be written in the time buffer (TB1) 141 specified by the next time buffer number 124 still up to 300 bytes remaining. Similarly, for example, FIG. 3 illustrates an example of the input-acceptable remaining byte count 125 which represents the input packet in the flow where the flow ID 121 becomes "#m" can be written in the time buffer (TB3) 141 specified by the next time buffer number 124 still up to 1520 bytes remaining.

As illustrated in FIG. 4, the buffer management table 13 is provided with a buffer management record 135 including a time buffer identification number 131, a buffer upper limit value 132, a queue length 133, and a reading out flag 134 for each of the time buffers (TBk) 141.

The time buffer identification number 131 represents an identification number for identifying the time buffer (TBk) 141 corresponding to the buffer management record 135.

The buffer upper limit value 132 is an example of "upper limit information" and represents an upper limit byte count that can be written in the respective time buffers (TBk) 141. To elaborate, the buffer upper limit value 132 represents an upper limit size of the respective time buffers (TBk) 141. It should be noted that the buffer upper limit value 132 represents the upper limit byte count that can be written in as the entire time buffers (TBk) 141 without distinguishing each flow, which is different from the above-mentioned input-acceptable upper limit byte count 122. For example, FIG. 4 illustrates an example of the buffer upper limit value 132 which represents that up to 125000 bytes can be written in the time buffer (TB1) 141. Similarly, for example, FIG. 4 illustrates an example of the buffer upper limit value 132 which represents that up to 125000 bytes can be written in the time buffer (TB2) 141. Similarly, for example, FIG. 4 illustrates an example of the buffer upper limit value 132 which represents that up to 125000 bytes can be written in the time buffer (TBn) 141.

The queue length 133 is an example of "queue length information" and represents a byte count of the input packet already written in the respective time buffers (TBk) 141. In other words, the queue length 133 represents a byte count of the input packet which is already written in the respective time buffers (TBk) 141 and also stands by for the reading out. Furthermore, in other words, the queue length 133 represents a byte count of the input packet in all the flows which is already written in the respective time buffers (TBk) 141 and also stands by for the reading out. For example, FIG. 4 illustrates an example of the queue length 133 which represents that the input packet of 87000 bytes is already written in the time buffer (TB1) 141 and stands by for the reading out. Similarly, for example, FIG. 4 illustrates an example of the queue length 133 which represents that the input packet of 42000 bytes is already written in the time buffer (TB2) 141 and stands by for the reading out. Similarly, for example, FIG. 4 illustrates an example of the queue length 133 which represents that the input packet is not written in the time buffer (TBn) 141.

The reading out flag 134 is a flag for identifying one time buffer (TBk) 141 where the reading out is carried out among the n pieces of time buffers (TBk) 141. For example, the reading out flag 134 is set as "1" in a case where the corresponding time buffer (TBk) 141 is in the reading out (read state). On the other hand, the reading out flag 134 is set as "0" the corresponding time buffer (TBk) 141 is not in the reading out. For example, FIG. 4 illustrates an example of the reading out flag 134 which represents that the time buffer (TB1) 141 is in the reading out and also the other time buffers from the time buffer (TB2) 141 to the time buffer (TBn) 141 are not in the reading out.

1-3) Operation by Packet Shaping Apparatus

Figure 5:
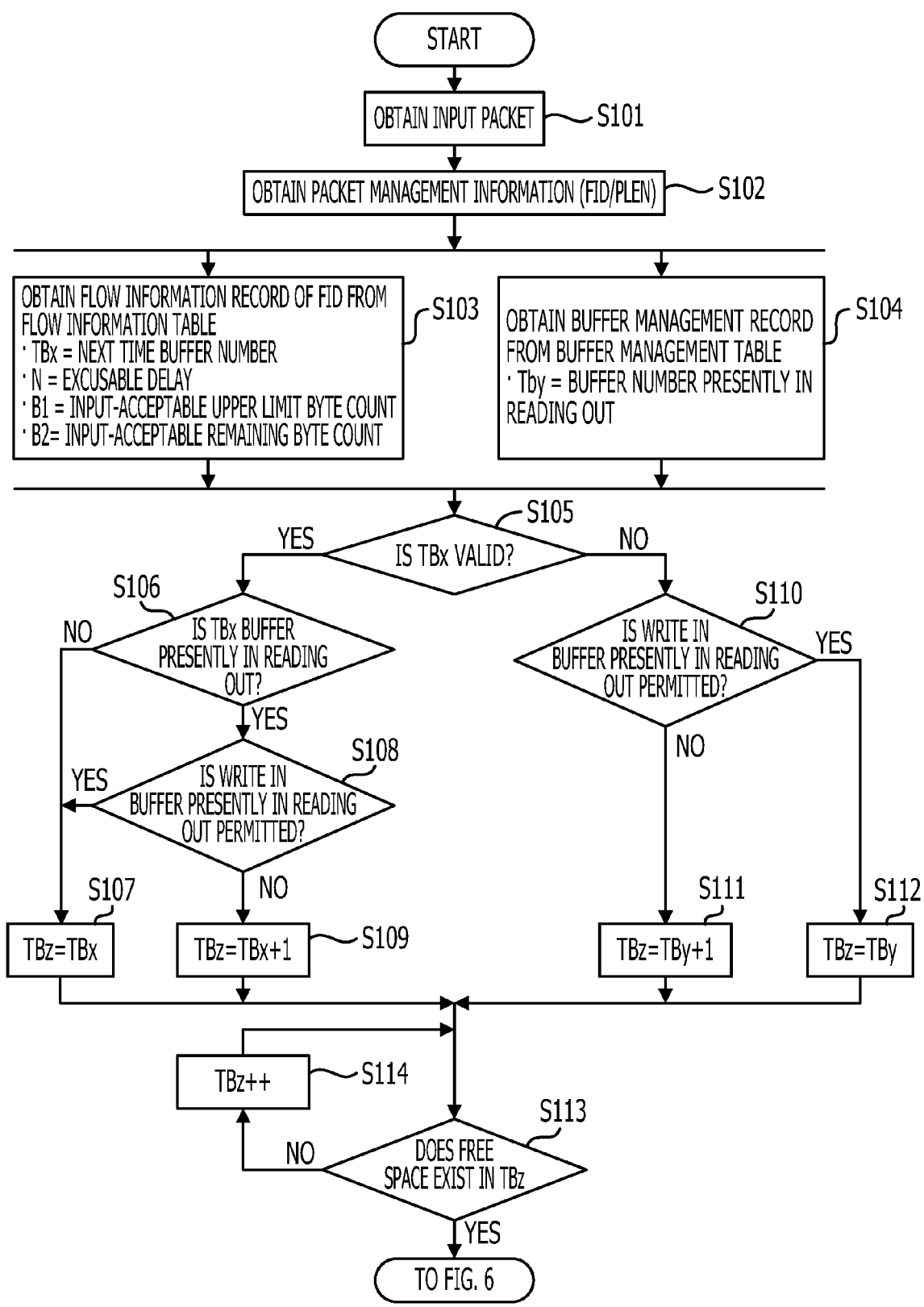
FIG. 5 is a flow chart illustrating a flow of a part of an operation by the packet shaping apparatus according to the first embodiment.
Figure 6:
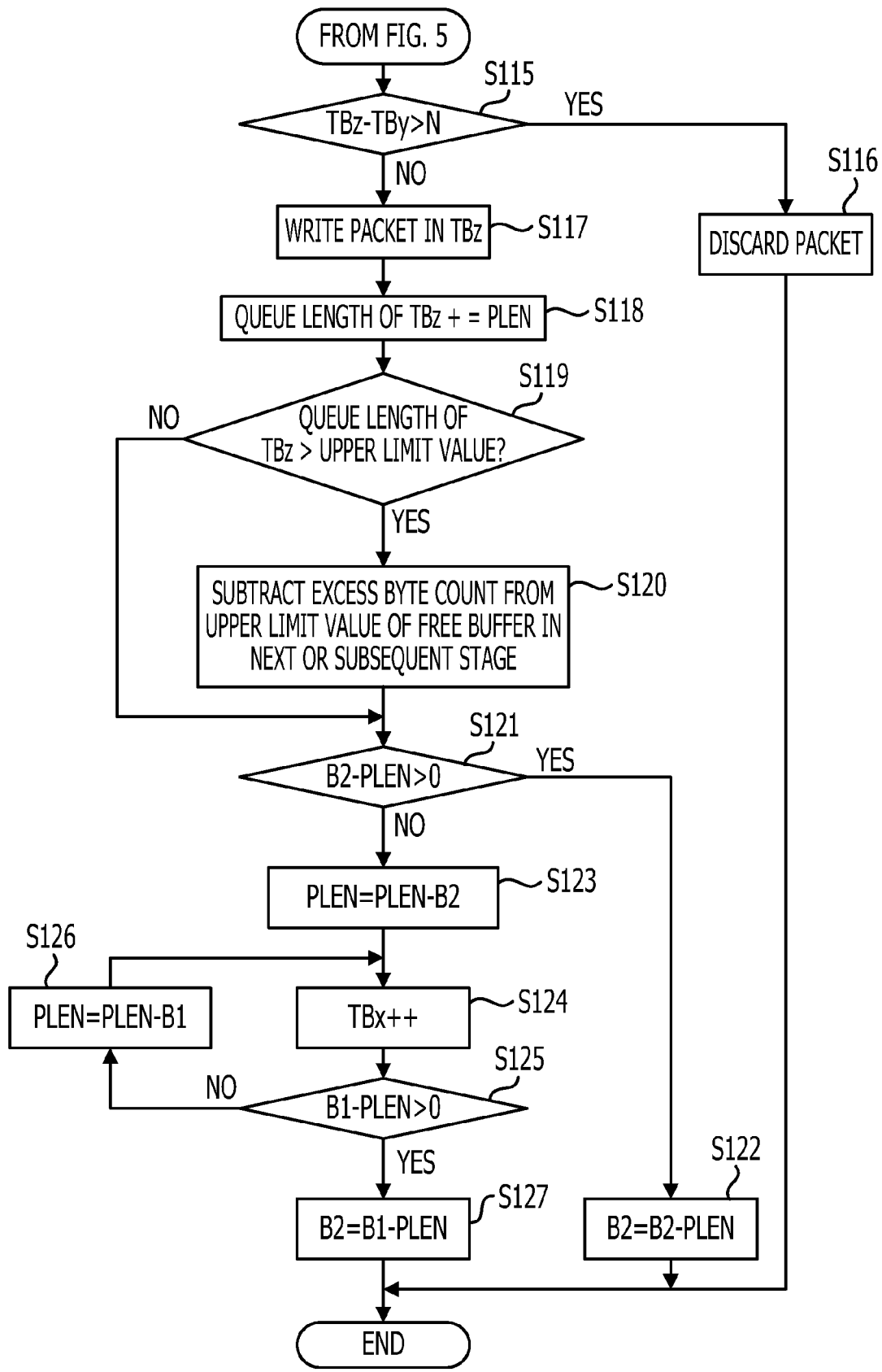
FIG. 6 is a flow chart illustrating a flow of another part of the operation by the packet shaping apparatus according to the first embodiment.

With reference to FIG. 5 and FIG. 6, a description will be made on an operation by the packet shaping apparatus 1 according to the first embodiment. FIG. 5 is a flow chart illustrating a part of a flow of the operation by the packet shaping apparatus 1 according to the first embodiment. FIG. 6 is a flow chart illustrating another part of the flow of the operation by the packet shaping apparatus 1 according to the first embodiment.

As illustrated in FIG. 5, the per-flow shaper unit 11 obtains an input packet (S101). After that, the per-flow shaper unit 11 obtains packet management information included in the obtained input packet (S102). The packet management information includes, for example, a variable FID (flow ID) for identifying a flow of the input packet, a variable PLEN (Packet LENgth) indicating a size of the input packet (byte count), and the like.

After that, the per-flow shaper unit 11 obtains the flow information record 126 having the flow ID 121 matched with the FID obtained in S102 from the flow information table 12 (S103). Hereinafter, the next time buffer number 124 included in the flow information record 126 is represented as "variable TBx (where x is an integer satisfying $1 \leq x \leq n$)". Similarly, the excusable delay 123 is represented as "variable N". Similarly, the input-acceptable upper limit byte count 122 is represented as "variable B1". Similarly, the input-acceptable remaining byte count 125 is represented as "variable B2".

Following the operation in S103, in tandem or in parallel, the per-flow shaper unit 11 obtains the buffer management record 135 from the buffer management table 13 (S104). For example, the per-flow shaper unit 11 recognizes the time buffer (TBk) 141 currently being read out by obtaining the reading out flag 134. It should be noted that hereinafter, the identification number of the time buffer (TBk) 141 currently being read out is represented as "variable TBy (where y is an integer satisfying $1 \leq y \leq n$)".

Subsequently, the per-flow shaper unit 11 determines whether or not the variable TBx is a valid value (S105). For example, in a case where a different input packet is already obtained in the past in the same flow as the flow of the input packet obtained in S101, it is possible to presume that the variable TBx corresponding to the relevant flow (that is, the next time buffer number 124) is valid. Therefore, in this case, the per-flow shaper unit 11 may determine that the variable TBx is valid. On the other hand, in a case where the input packet obtained in S101 is the input packet obtained for the first time in the relevant flow of the input packet, it is possible to presume that a valid value is not yet set in the variable TBx corresponding to the relevant flow (that is, the next time buffer number 124). Therefore, in this case, the per-flow shaper unit 11 may determine that the variable TBx is not valid. Alternatively, in a case where the read time of the time buffer (TBx) 141 is in the past as compared with the read time of the time buffer (TBy) 141 currently being read out (that is, TBx<TBy (in other words, x<y) is established), it is preferable to deal with the variable TBx as not valid. Therefore, in this case, the per-flow shaper unit 11 may determine that the variable TBx is not valid.

As a result of the determination in S105, in a case where it is determined that the variable TBx is valid (S105: Yes), the per-flow shaper unit 11 determines whether or not the time buffer (TBx) 141 is the time buffer (TBy) 141 currently being read out (S106). To elaborate, the per-flow shaper unit 11 determines whether or not TBx=TBy (in other words, x=y) is established.

As a result of the determination in S106, in a case where it is determined that the time buffer (TBx) 141 is not the time buffer (TBy) 141 currently being read out (S106: No), the per-flow shaper unit 11 sets the time buffer (TBx) 141 as a time buffer (TBz) 141 that becomes a candidate in which the input packet obtained in S101 should be written (TBz (where z is an integer satisfying $1 \leq z \leq n$)) 141 (S107). To elaborate, the per-flow shaper unit 11 sets TBx in TBz (in other words, x is set in z).

On the other hand, as a result of the determination in S106, in a case where it is determined that the time buffer (TBx) 141 is the time buffer (TBy) 141 currently being read out (S106: Yes), the per-flow shaper unit 11 determines whether or not a write to the time buffer (TBy) 141 presently in the reading out is permitted (S108). It should be noted that whether or not the write to the time buffer (TBy) 141 presently in the reading out is permitted may be set in advance with respect to the packet shaping apparatus 1.

As a result of the determination in S108, in a case where it is determined that the write to the time buffer (TBy) 141 presently in the reading out is permitted (S108: Yes), the per-flow shaper unit 11 sets the time buffer (TBx) 141 as the time buffer (TBz) 141 that becomes the candidate in which the input packet obtained in S101 should be written (S107). To elaborate, the per-flow shaper unit 11 sets TBx in TBz (in other words, x is set in z).

On the other hand, as a result of the determination in 5108, in a case where it is determined that the write to the time buffer (TBy) 141 presently in the reading out is not permitted (S108: No), the per-flow shaper unit 11 sets a time buffer (TBx+1) 141 in the next stage of the time buffer (TBx) 141 as the time buffer (TBz) 141 that becomes the candidate in which the input packet obtained in S101 should be written (S109). To elaborate, the per-flow shaper unit 11 sets TBx+1 in TBz (in other words, x+1 is set in z).

On the other hand, as a result of the determination in S105, in a case where it is determined that the variable TBx is not valid (S105: No), the per-flow shaper unit 11 determines whether or not a write to the time buffer (TBy) 141 presently in the reading out is permitted (S110).

As a result of the determination in S110, in a case where it is determined that the write to the time buffer (TBy) 141 presently in the reading out is not permitted (S110: No), the per-flow shaper unit 11 sets a time buffer (TBy+1) 141 in the next stage of the time buffer (TBy) 141 presently in the reading out as the time buffer (TBz) 141 that becomes the candidate in which the input packet obtained in S101 should be written (S111). To elaborate, the per-flow shaper unit 11 sets TBy+1 in TBz (in other words, y+1 is set in z).

On the other hand, as a result of the determination in S110, in a case where it is determined that the write to the time buffer (TBy) 141 presently in the reading out is permitted (S110: Yes), the per-flow shaper unit 11 sets the time buffer (TBy) 141 as the time buffer (TBz) 141 that becomes the candidate in which the input packet obtained in S101 should be written (S112). To elaborate, the per-flow shaper unit 11 sets TBy in TBz (in other words, y is set in z).

It should be noted that the determination on whether or not the write to the time buffer (TBy) 141 presently in the reading out is permitted may not necessarily be carried out. To elaborate, the per-flow shaper unit 11 may not necessarily carry out the determination operations in S106, S108, and S110. In this case, in a case where it is determined that the variable TBx is valid (S105: Yes), the per-flow shaper unit 11 may set the time buffer (TBx) 141 as the time buffer (TBz) 141 that becomes the candidate in which the input packet obtained in S101 should be written (S107). On the other hand, in a case where it is determined that the variable TBx is not valid (S105: No), the per-flow shaper unit 11 may the time buffer (TBy) 141 or the time buffer (TBy+1) 141 as the time buffer (TBz) 141 that becomes the candidate in which the input packet obtained in S101 should be written (S111 or S112).

Subsequently, the per-flow shaper unit 11 determines whether or not the time buffer (TBz) 141 that becomes the candidate in which the input packet obtained in S101 should be written has a free space (S113). To be specific, the per-flow shaper unit 11 obtains the buffer management record 135 where the time buffer identification number 131 becomes "TBz" from the buffer management table 13. It should be noted that the per-flow shaper unit 11 may extract the buffer management record 135 where the time buffer identification number 131 becomes "TBz" from among the buffer management records 135 already obtained in S104. The per-flow shaper unit 11 determines whether or not the queue length 133 of the buffer management record 135 thus obtained is smaller than the buffer upper limit value 132. In a case where it is determined that the queue length 133 of the buffer management record 135 thus obtained is smaller than the buffer upper limit value 132, the per-flow shaper unit 11 may determine that the time buffer (TBz) 141 has the free space. On the other hand, in a case where it is determined that the queue length 133 of the buffer management record 135 thus obtained is not smaller than the buffer upper limit value 132, the per-flow shaper unit 11 may determine that the time buffer (TBz) 141 does not have a free space.

As a result of the determination in S113, in a case where it is determined that the time buffer (TBz) 141 does not have a free space (S113: No), after TBz (in other words, z) is incremented by 1 (S114), the per-flow shaper unit 11 repeatedly performs the operation in S113. To elaborate, the per-flow shaper unit 11 sets the time buffer (TBz+1) 141 in the next stage of the time buffer (TBz) 141 determined to have no free space as the new time buffer (TBz) 141 and then repeatedly performs the operation in S113.

On the other hand, as a result of the determination in S113, in a case where it is determined that the time buffer (TBz) 141 has the free space (S113: Yes), the per-flow shaper unit 11 performs the operation illustrated in FIG. 6.

As illustrated in FIG. 6, the per-flow shaper unit 11 determines whether or not a difference between a read time of the time buffer (TBz) 141 that becomes a candidate in which the input packet should be written and a read time of the time buffer (TBy) 141 currently being read out is larger than the variable N (that is, the excusable delay 123) (S115). To elaborate, the per-flow shaper unit 11 determines whether or not a delay time from a time when the input packet is written in the time buffer (TBz) 141 until a time when the input packet is actually read out from the relevant time buffer (TBz) 141 is larger than the variable N. It should be noted that in a case where "1 millisecond" is used as an example of the above-mentioned predetermined time T1, a difference of the identification number TBk of the time buffer (TBk) 141 is equivalent to a delay time [millisecond]. Therefore, in the example illustrated in FIG. 6, the per-flow shaper unit 11 determines whether or not a difference (TBz−TBy (in other words, z−y)) between the identification number TBz of the time buffer (TBz) 141 and the identification number TBy of the time buffer (TBy) 141 is larger than the variable N.

As a result of the determination in S115, in a case where it is determined that TBz−TBy (that is, the delay time) is larger than the variable N (S115: Yes), the per-flow shaper unit 11 discards the input packet obtained in S101 (S116). After that, the packet shaping apparatus 1 may end the operation or repeatedly perform the operation again in and after S101 of FIG. 5.

On the other hand, as a result of the determination in S115, in a case where it is determined that TBz−TBy (that is, the delay time) is not larger than the variable N (S115: No), the per-flow shaper unit 11 writes the input packet obtained in S101 in the time buffer (TBz) 141 (S117).

It should be noted that the per-flow shaper unit 11 may not necessarily perform the operation in S115 and S116. To elaborate, the per-flow shaper unit 11 may write the input packet without taking into account the delay time. In this case, the flow information table 12 may not necessarily include the excusable delay 123.

Subsequently, the per-flow shaper unit 11 updates the queue length 133 of the buffer management record 135 where the time buffer identification number 131 becomes "TBz" (S118). To be specific, the per-flow shaper unit 11 writes a value obtained by adding the queue length 133 before the update with a variable PLEN (that is, a size of the input packet written in this time (byte count)) in the buffer management table 13 as the queue length 133 after the update.

Subsequently, the per-flow shaper unit 11 determines whether or not the queue length 133 updated in S118 is larger than the buffer upper limit value 132 of the buffer management record 135 where the time buffer identification number 131 becomes "TBz" (S119).

As a result of the determination in S119, in a case where it is determined that the queue length 133 updated in S118 is larger than the buffer upper limit value 132 of the buffer management record 135 where the time buffer identification number 131 becomes "TBz" (S119: Yes), the per-flow shaper unit 11 updates the buffer upper limit value 132 of the time buffer (TBz +a (where a is an integer satisfying 1≤a≤n)) 141 having the free space in the next or subsequent stage of the time buffer (TBz) (S120). To be specific, the per-flow shaper unit 11 subtracts a byte count by which the queue length 133 (that is, the queue length updated in S118) exceeds the buffer upper limit value 132 (that is, the buffer upper limit value 132 of the buffer management record 135 where the time buffer identification number 131 becomes "TBz") from the buffer upper limit value 132 of the buffer management record 135 where the time buffer identification number 131 becomes "TBz+a". The per-flow shaper unit 11 writes the value obtained as the result of the subtraction in the buffer management table 13 as the buffer upper limit value 132 after the update of the buffer management record 135 where the time buffer identification number 131 becomes "TBz+a".

On the other hand, as a result of the determination in S119, in a case where it is determined that the queue length 133 updated in S118 is not larger than the buffer upper limit value 132 of the buffer management record 135 where the time buffer identification number 131 becomes "TBz" (S119: No), the per-flow shaper unit 11 may not necessarily perform the operation in S120.

It should be noted that the per-flow shaper unit 11 may not necessarily perform the operation in S119 and S120.

Subsequently, the per-flow shaper unit 11 performs the update operation on the flow information table 12 (from S121 to S127). To be specific, the per-flow shaper unit 11 determines whether or not the variable B2 (that is, the input-acceptable remaining byte count 125) is larger than the variable PLEN (that is, the size of the input packet written in this time (byte count)) (S121).

As a result of the determination in S121, in a case where it is determined that the variable B2 is larger than the variable PLEN (S121: Yes), the per-flow shaper unit 11 updates the variable B2 (that is, the input-acceptable remaining byte count 125) (S122). To be specific, the per-flow shaper unit 11 writes a value obtained by subtracting the variable PLEN from the variable B2 in the flow information table 12 as the variable B2 after the update (that is, the input-acceptable remaining byte count 125 after the update). After that, the packet shaping apparatus 1 may end the operation or repeatedly perform the operation again in and after S101 of FIG. 5.

On the other hand, as a result of the determination in S121, in a case where it is determined that the variable B2 is not larger than the variable PLEN (S121: No), the per-flow shaper unit 11 updates the variable PLEN (S123). To be specific, the per-flow shaper unit 11 sets a value obtained by subtracting the variable B2 from the variable PLEN as the variable PLEN after the update.

Subsequently, the per-flow shaper unit 11 updates the variable TBx (that is, the next time buffer number 124) (S124). To be specific, the per-flow shaper unit 11 writes a value obtained by incrementing the variable TBx (in other words, x) by 1 in the flow information table 12 as the next time buffer number 124 after the update. To elaborate, the per-flow shaper unit 11 deals with the time buffer (TBx+1) 141 in the next stage of the time buffer (TBx) 141 as the new time buffer (TBx) 141. After that, the per-flow shaper unit 11 determines whether or not the variable B1 for the next time buffer (that is, the input-acceptable upper limit byte count 122) is larger than the variable PLEN (that is, the variable PLEN after the update which is updated in S123) (S125).

As a result of the determination in S125, in a case where it is determined that the variable B1 is not larger than the variable PLEN (S125: No), the per-flow shaper unit 11 updates the variable PLEN (S126). To be specific, the per-flow shaper unit 11 sets a value obtained by subtracting the variable B1 from the variable PLEN as the variable PLEN after the update. After that, the per-flow shaper unit 11 repeatedly performs the operation in and after S124.

On the other hand, as a result of the determination in S125, in a case where it is determined that the variable B1 is larger than the variable PLEN (S125: Yes), the per-flow shaper unit 11 updates the variable B2 for the next time buffer (that is, the input-acceptable remaining byte count 125) (S127). To be specific, the per-flow shaper unit 11 writes a value obtained by subtracting the variable PLEN from the variable B1 in the flow information table 12 as the variable B2 after the update (that is, the input-acceptable remaining byte count 125 after the update). After that, the packet shaping apparatus 1 may end the operation or repeatedly perform the operation again in and after S101 of FIG. 5.

With regard to the update operation on the flow information table 12 (from S121 to S127) described above, a detailed description will be made with examples illustrated in FIGS. 7A to 7D. FIGS. 7A to 7D are explanatory diagrams illustrating a relation between the variable B1, the variable B2, and the variable PLEN in a case where the update operation on the flow information table 12 is carried out.

Figure 7A:
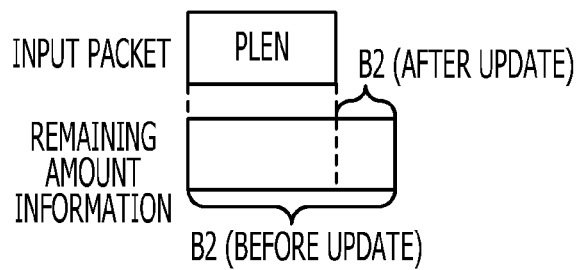
FIGS. 7A to 7D are explanatory diagrams illustrating a relation between variables in a case where an update operation on the flow information table is carried out according to the first embodiment.

FIG. 7A illustrates an example in which the variable B2 before the update (that is, the input-acceptable remaining byte count 125 before the update) is larger than the variable PLEN before the update (that is, the size of the input packet written in this time). In this case, the per-flow shaper unit 11 writes a value obtained by subtracting the variable PLEN before the update from the variable B2 before the update in the flow information table 12 as the variable B2 after the update (S122 of FIG. 6).

Figure 7B:
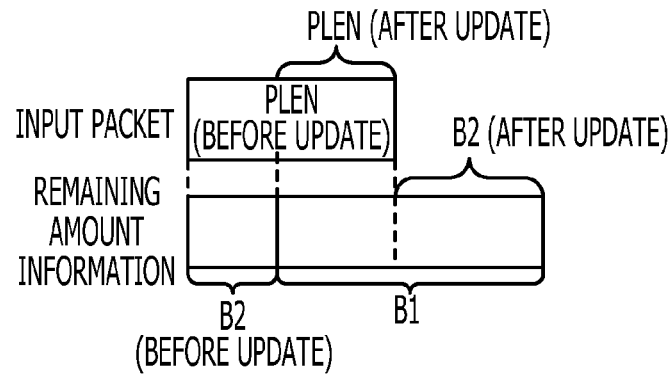

FIG. 7B illustrates an example in which the variable B2 before the update is smaller than the variable PLEN before the update. In this case, the per-flow shaper unit 11 sets a value obtained by subtracting the variable B2 before the update from the variable PLEN before the update as the variable PLEN after the update (S123 of FIG. 6). Furthermore, the per-flow shaper unit 11 performs an increment on the variable TBx for the first time (S124). After that, as illustrated in FIG. 7B, it is assumed that the variable PLEN after the update becomes smaller than the variable B1 (S125 of FIG. 6: Yes). In this case, the per-flow shaper unit 11 writes a value obtained by subtracting the variable PLEN after the update from the variable B1 in the flow information table 12 as the variable B2 after the update. It should be noted that the variable PLEN after the update can be represented as the variable PLEN before the update–the variable B2 before the update. For this reason, in the example illustrated in FIG. 7B, the variable B2 after the update can be represented as the variable B1−the variable PLEN after the update=the variable B1−(the variable PLEN before the update−the variable B2 before the update)=the variable B2 before the update−the variable PLEN before the update+the variable B1.

Figure 7C:
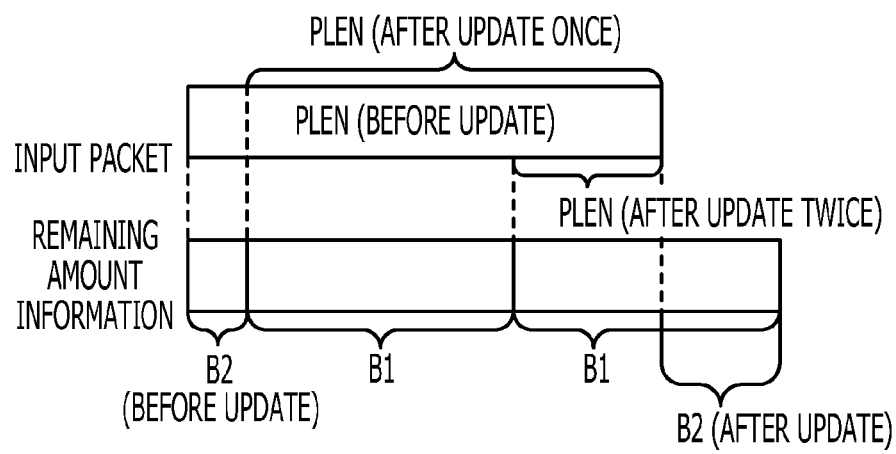

FIG. 7C illustrates a second example in which the variable B2 before the update is smaller than the variable PLEN before the update. In this case, the per-flow shaper unit 11 sets the value obtained by subtracting the variable B2 before the update from the variable PLEN before the update as the variable PLEN after the update carried out once (S123 of FIG. 6). Furthermore, the per-flow shaper unit 11 performs the increment on the variable TBx for the first time (S124). After that, as illustrated in FIG. 7C, it is assumed that the variable PLEN after the update carried out once is still larger than the variable B1 (S125 of FIG. 6: No). In this case, the per-flow shaper unit 11 sets a value obtained by subtracting the variable B1 from the variable PLEN after the update carried out once as the variable PLEN after the update carried out twice (S126 of FIG. 6). Furthermore, the per-flow shaper unit 11 performs the increment on the variable TBx for the second time (S124). After that, as illustrated in FIG. 7C, it is assumed that the variable PLEN after the update carried out twice becomes smaller than the variable B1 (S125 of FIG. 6: Yes). In this case, the per-flow shaper unit 11 writes a value obtained by subtracting the variable PLEN after the update carried out twice from the variable B1 in the flow information table 12 as the variable B2 after the update. It should be noted that the variable PLEN after the update carried out twice can be represented as the variable PLEN after the update carried out once−the variable B1. Furthermore, the variable PLEN after the update carried out once can be represented as the variable PLEN before the update−the variable B2 before the update. For this reason, in the example illustrated in FIG. 7C, the variable B2 after the update can be represented as the variable B1−the variable PLEN after the update carried out twice=the variable B1−(the variable PLEN after the update carried out once−the variable B1)=the variable B1−((the variable PLEN before the update−the variable B2 before the update)−the variable B1)=the variable B2 before the update−the variable PLEN before the update+the variable B1×2.

Figure 7D:
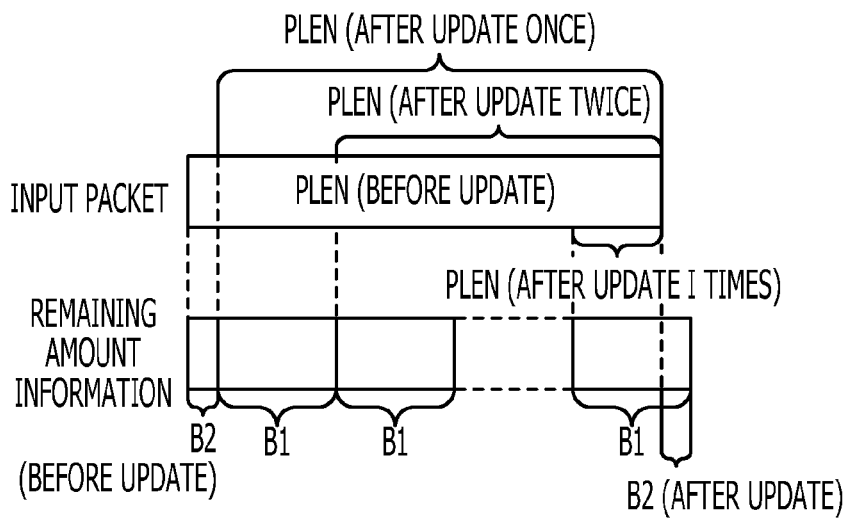

FIG. 7D illustrates a third example in which the variable B2 before the update is smaller than the variable PLEN before the update. In this case, the per-flow shaper unit 11 sets the value obtained by subtracting the variable B2 before the update from the variable PLEN before the update as the variable PLEN after the update carried out once (S123 of FIG. 6). Furthermore, the per-flow shaper unit 11 performs the increment on the variable TBx for the first time (S124). After that, as illustrated in FIG. 7D, it is assumed that the variable PLEN after the update carried out once is yet still larger than the variable B1 (S125 of FIG. 6: No). In this case, the per-flow shaper unit 11 sets the value obtained by subtracting the variable B1 from the variable PLEN after the update carried out once as the variable PLEN after the update carried out twice (S126 of FIG. 6). Furthermore, the per-flow shaper unit 11 performs the increment on the variable TBx for the second time (S124). After that, a similar operation is repeatedly carried out, and as illustrated in FIG. 7D, and it is assumed that the variable PLEN becomes smaller than the variable B1 at a time point when the increment on the variable TBx for i (where i is an integer larger than or equal to 1) times is carried out (S125 of FIG. 6: Yes). To elaborate, it is assumed that the variable PLEN after the update carried out i times is smaller than the variable B1 (S125 of FIG. 6: Yes). In this case, the per-flow shaper unit 11 writes a value obtained by subtracting the variable PLEN after the update carried out i times from the variable B1 in the flow information table 12 as the variable B2 after the update. It should be noted that the variable PLEN after the update carried out i times can be represented as i−the variable PLEN after the update carried out once−the variable B1. For this reason, in the example illustrated in FIG. 7D, the variable B2 after the update can be represented as the variable B1−the variable PLEN after the update carried out i times=the variable B1−(i−the variable PLEN after the update carried out once−the variable B1)= . . . =the variable B2 before the update−the variable PLEN before the update+the variable B1×i.

As the examples illustrated from FIG. 7A to FIG. 7D are summarized, it is also possible to represent that the variable B2 is updated in the following manner. First, the variable B2 after the update is set as the variable B2 before the update−the variable PLEN before the update. In a case where the variable B2 after the update has a positive value, the update of the variable B2 is ended. On the other hand, in a case where the variable B2 after the update has a negative value, the variable TBx is incremented, and also a value obtained by adding the variable B1 to the variable B2 after the update each time the increment is carried out is set as the variable B2 after the further update. Hereinafter, a similar operation is repeatedly carried out until the variable B2 after the update becomes a positive value.

Figure 8:
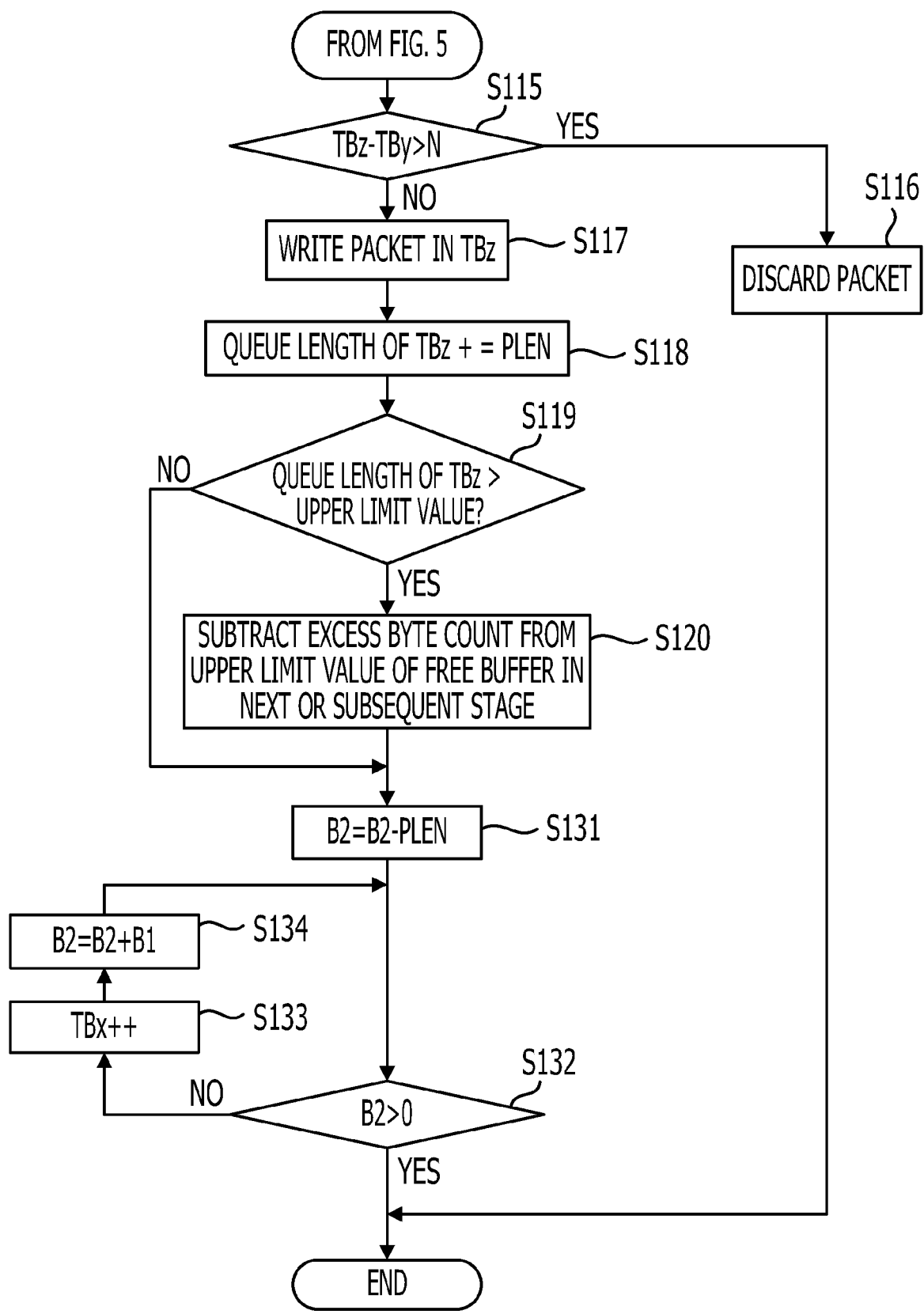
FIG. 8 is a flow chart illustrating a flow of another part of the operation by the packet shaping apparatus according to the first embodiment.

By taking into account the procedure of the above-mentioned update operation on the flow information table 12, the flow chart illustrated in FIG. 6 can be written into a flow chart illustrated in FIG. 8. It should be noted that the flow chart illustrated in FIG. 8 performs an operation substantially similar to the flow chart illustrated in FIG. 6.

As illustrated in FIG. 8, an operation from S115 to S120 is the same as the operation illustrated in FIG. 6. Subsequently to S120, the per-flow shaper unit 11 updates the variable B2 (S131). To be specific, the per-flow shaper unit 11 sets the value obtained by subtracting the variable PLEN from the variable B2 as the variable B2 after the update. At this time, the per-flow shaper unit 11 may write or may not necessarily write the variable B2 after the update in the flow information table 12. In a case where the variable B2 after the update is not written, the per-flow shaper unit 11 preferably stores the variable B2 after the update as an internal parameter.

After that, the per-flow shaper unit 11 determines whether or not the variable B2 after the update has a positive value (S132).

As a result of the determination in S132, in a case where it is determined that the variable B2 after the update has a positive value (S132: Yes), and after that, the packet shaping apparatus 1 may end the operation or repeatedly perform the operation again in and after S101 of FIG. 5. It should be noted that in a case where the variable B2 after the update is not written in the flow information table 12 in a stage of S131 (or, S134 which will be described later), at a timing when it is determined that the variable B2 after the update has a positive value, the per-flow shaper unit 11 may write the variable B2 after the update in the flow information table 12.

On the other hand, as a result of the determination in S132, in a case where it is determined that the variable B2 after the update does not have a positive value (S132: No), the per-flow shaper unit 11 updates the variable TBx (that is, the next time buffer number 124) (S124). To be specific, the per-flow shaper unit 11 writes the value obtained by incrementing the variable TBx (in other words, x) by 1 in the flow information table 12 as the next time buffer number 124 after the update.

After that, the per-flow shaper unit 11 updates the variable B2 (S134). To be specific, the per-flow shaper unit 11 sets a value obtained by adding the variable B1 to the variable B2 as the variable B2 after the update. At this time, the per-flow shaper unit 11 may write or may not necessarily write the variable B2 after the update in the flow information table 12. In a case where the variable B2 after the update is not written, the per-flow shaper unit 11 preferably stores the variable B2 after the update as an internal parameter.

Hereinafter, the operation in and after S132 is repeatedly performed.

As described above, with the packet shaping apparatus 1 according to the first embodiment, while the flow information table 12 is referred to and updated, it is possible to write the input packet in one of the plurality of time buffers (TBk) 141. For this reason, the packet shaping apparatus 1 according to the first embodiment can carry out the efficient shaping.

With the packet shaping apparatus 1 according to the first embodiment, as compared with the shaping apparatus provided with the time table notched in the time slots having the size fixed to the minimum packet length (64 bytes), it is possible to relatively simplify the hardware structure. For example, in the shaping apparatus provided with the time table notched in the time slots having the size fixed to the minimum packet length (64 bytes), to prepare a time table having a 50 millisecond time width on a network with a transmission capacity of 1 Gbps, it is necessary to use approximately 100000 pieces of time slots (that is, 100000 pieces of addressed). On the other hand, with the shaping apparatus 1 according to the first embodiment, it suffices that for example, 50 pieces of the time buffers (TBk) 141 that switches every 1 millisecond are prepared. In addition, with the packet shaping apparatus 1 according to the first embodiment, it is also possible to reduce the data amount for the management information for managing the input packet written in the time buffer (TBk) 141.

With the packet shaping apparatus 1 according to the first embodiment, even in a case where the queue length 133 of the time buffer (TBk) 141 exceeds the buffer upper limit value 132, the write of the input packet can be permitted. For example, with respect to the time buffer (TBk) 141 where the buffer upper limit value 132 is 125 k bytes and also the queue length 133 is 124 k bytes, the write of the input packet of 2 k bytes can be newly permitted. Therefore, the decrease in the throughput can be suppressed. It should be noted that even if a further write of the input packet is permitted in a case where the queue length 133 exceeds the buffer upper limit value 132, the buffer upper limit value 132 of the time buffer (TBk) 141 in the next or subsequent stage can be adjusted. For this reason, as a whole of the packet shaping apparatus 1, influences caused by a situation where the queue length 133 exceeds the buffer upper limit value 132 are not accumulated.

With the packet shaping apparatus 1 according to the first embodiment, at a time point when the input packet is written in the time buffer (TBk), a timing when the relevant input packet is read out is confirmed. To elaborate, the timing when the input packet is read out hardly delays unintentionally. In addition, with the packet shaping apparatus 1 according to the first embodiment, in a case where the delay time from a time when the input packet is newly written until a time when the relevant input packet is actually read out exceeds the excusable delay 123, the relevant input packet can be discarded. For this reason, it is possible to appropriately suppress inconvenience in which the input packet is retained in the time buffer (TBk) 141 for a long period of time unintentionally.

With the packet shaping apparatus 1 according to the first embodiment, the input packet can be written in the time buffer (TBk) 141 presently in the reading out. Therefore, the buffering delay can be reduced or almost eliminated. It should be however noted that the size writable in the time buffer (TBk) 141 presently in the reading out (byte count) changes from moment to moment. For example, after the reading out of the time buffer (TBk) 141 where the buffer upper limit value 132 is 125 k bytes (in other words, at a time point when 0.5 milliseconds elapses since the upper limit size that can be read out in 1 milliseconds is 125 k bytes) is started, the size writable in the relevant time buffer (TBk) 141 (byte count) is 125 k bytes☐0.5=62.5 k bytes. For this reason, the per-flow shaper unit 11 preferably writes the input packet in the time buffer (TBk) 141 presently in the reading out while taking into account the size writable in the time buffer (TBk) 141 presently in the reading out (byte count) changes from moment to moment.

With the packet shaping apparatus 1 according to the first embodiment, the write of the input packet with respect to the time buffer (TBk) 141 presently in the reading out can be prohibited. For this reason, the input packet does not need to be written while taking into account the size writable in the time buffer (TBk) 141 presently in the reading out (byte count) changes from moment to moment.

(2) Second Embodiment

With reference to FIG. 9A and FIG. 9B to FIG. 14, a description will be made on a packet shaping apparatus 2 according to a second embodiment. It should be noted that by assigning the same reference numerals and numbers to the same configurations and operations as those of the packet shaping apparatus 1 according to the first embodiment described above, a detailed description on those will be omitted. In addition, all or a part of the various modes of the configurations and the operations of the first embodiment may be appropriately applied to the second embodiment. By contrast, all or a part of the various modes of the configurations and the operations of the second embodiment may be appropriately applied to the first embodiment.

(2-1) Configuration of Packet Shaping Apparatus

Figure 9A:
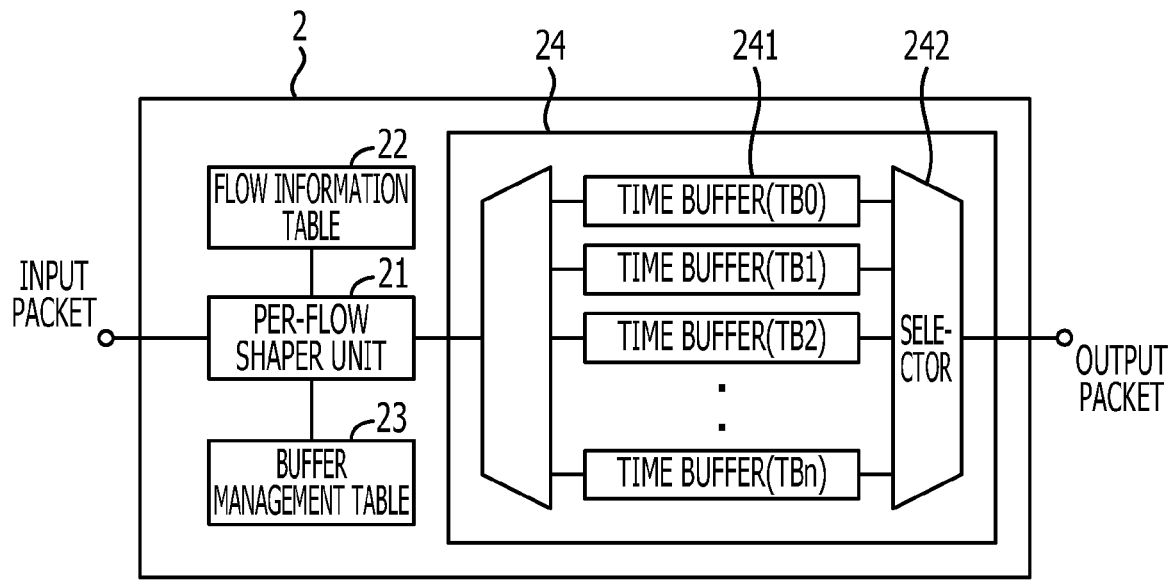
FIGS. 9A and 9B are block diagrams of an exemplary function block of a packet shaping apparatus according to a second embodiment.
Figure 9B:
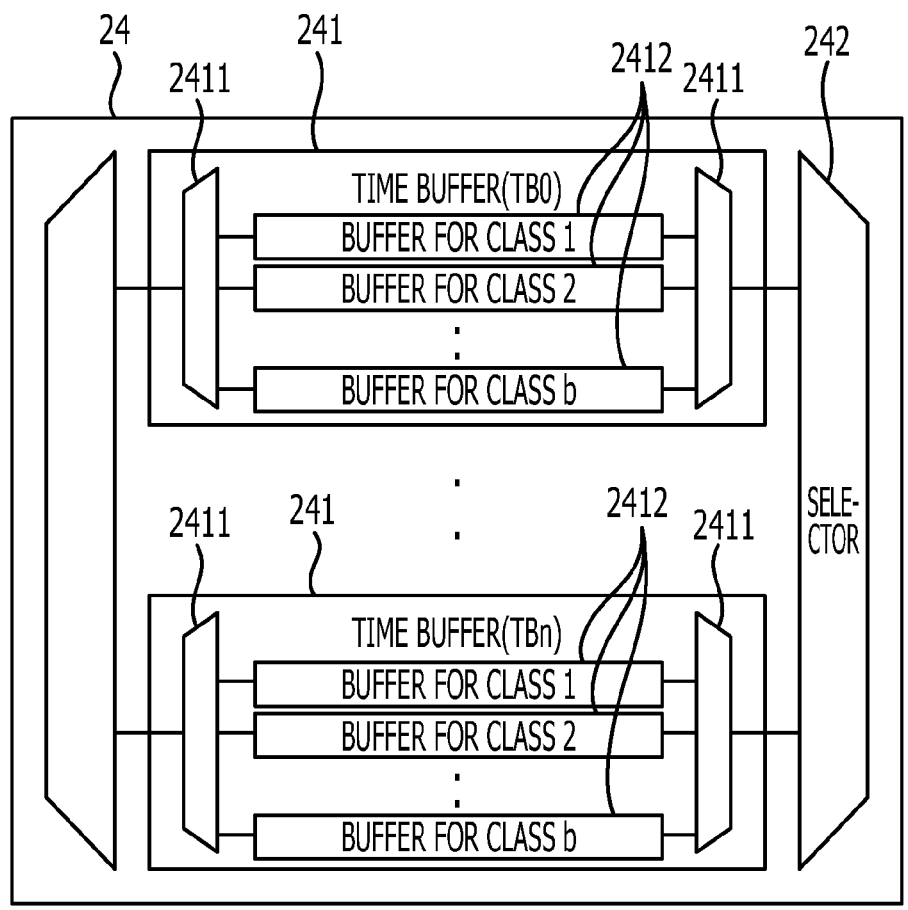

With reference to FIGS. 9A and 9B, a description will be made on a configuration of the packet shaping apparatus 2 according to the second embodiment. FIGS. 9A and 9B are block diagrams of an exemplary functional block of the packet shaping apparatus 2 according to the second embodiment.

As illustrated in FIG. 9A and FIG. 9B, like the packet shaping apparatus 1 according to the first embodiment, the packet shaping apparatus 2 according to the second embodiment is provided with a per-flow shaper unit 21, a flow information table 22, a buffer management table 23, and a buffer unit 24.

The per-flow shaper unit 21 is similar to the above-mentioned per-flow shaper unit 11. To be specific, the per-flow shaper unit 21 writes the input packet that is input to the packet shaping apparatus 2 in one of the n pieces of the time buffers (TBk) 241 provided to the buffer unit 24.

According to the second embodiment, as illustrated in FIG. 9B, each of n pieces of the time buffers (TBk) 241 is provided with b pieces of buffers 2412 (where b is an integer larger than or equal to 1) for a class j (where j is an integer satisfying $1 \leq j \leq b$). It should be noted that "class" according to the second embodiment is, for example, a purpose meaning a priority where the input packet is individually allocated in accordance with a transmission or reception contractor, a service for the input packet. Therefore, the per-flow shaper unit 21 preferably writes the input packet in at least one buffer 2412 for the class j corresponding to the class of the input packet among the b pieces of the buffers 2412 for the class j. On the basis of at least one of the flow information table 22 and the buffer management table 23, the per-flow shaper unit 21 preferably decides at least one time buffer 241 in which the input packet should be written among the n pieces of the time buffers (TBk) 241. In addition, on the basis of at least one of the flow information table 22 and the buffer management table 23, the per-flow shaper unit 21 preferably decides at least one buffer 2412 for the class j in which the input packet should be written among the b pieces of the buffers 2412 for the class j provided to the decided one time buffer 241.

It should be noted that the b pieces of the buffers 2412 for the class j may be physically or logically distinguished one another in the time buffer (TBk) 241 or may not necessarily be physically or logically distinguished one another. As long as the input packets in accordance with b types of classes can be distinguished one another and recoded, the time buffer (TBk) 241 may be the same as the above-mentioned time buffer (TBk) 141.

The flow information table 22 is a table including information related to the flow of the input packet for each of the flows and for each of the classes. A detail of the flow information table 22 will be described in detail later with reference to FIG. 10, and therefore a detailed description herein will be omitted.

The buffer management table 23 is a table including information for managing the n pieces of the time buffers (TBk) 241 for each of the classes. A detail of the buffer management table 23 will be described in detail later with reference to FIG. 11, and therefore a detailed description herein will be omitted.

The buffer unit 24 is provided with the n pieces of the time buffers (TBk) 241 and a selector 242.

Each of the n pieces of the time buffers (TBk) 241 is provided with a selector 2411 and the b pieces of the buffers 2412 for the class j. Each of the b pieces of the buffers 2412 for the class j temporarily stores the input packet written by the per-flow shaper unit 21. The selector 2411 selects at least one buffer 2412 for the class j in which the input packet should be written from among the b pieces of the buffers 2412 for the class j. Also, the selector 2411 selects at least one buffer 2412 for the class j from which the input packet should be read out from among the b pieces of the buffers 2412 for the class j. The selector 2411 reads out the input packet written in the selected at least one buffer 2412 for the class j as an output packet.

An upper limit of each of the n pieces of the time buffers (TBk) 241 is set as a maximum data amount that can be read out within the predetermined time T1 from the respective time buffers (TBk) 241. It should be however noted that the upper limit of each of the n pieces of the time buffers (TBk) 241 may be set as a value obtained by taking into account a predetermined margin with respect to the maximum data amount that can be read out within the predetermined time T1 from the respective time buffers (TBk) 241 (for example, a margin equivalent to 1 packet).

Like the above-mentioned selector 142, the selector 242 sequentially selects one time buffer (TBk) 241 from which the written input packet is read out from among the n pieces of the time buffers (TBk) 241 every predetermined times T1. Also, while the predetermined time T1 elapses, the selector 242 reads out the input packet written in the selected one time buffer (TBk) 241 as the output packet.

It should be noted that a hardware configuration of the packet shaping apparatus 2 according to the second embodiment may be similar to the hardware configuration of the packet shaping apparatus 1 according to the first embodiment.

(2-2) Data Structures of Flow Information Table and Buffer Management Table

With reference to FIG. 10 and FIG. 11, a description will be made on data structures of the flow information table 22 and the buffer management table 23 according to the second embodiment. FIG. 10 is a table diagram of the data structure of the flow information table 22 according to the second embodiment. FIG. 11 is a table diagram of the data structure of the buffer management table 23 according to the second embodiment.

As illustrated in FIG. 10, the flow information table 22 is provided with a flow information record 226 including a flow ID 221, a class ID 227, an input-acceptable upper limit byte count 222, an excusable delay 223, a next time buffer number 224, and an input-acceptable remaining byte count 225 for each of the flows and for each of the classes.

The flow ID 221 is information similar to the above-mentioned flow ID 121 and represents identification information (ID) for identifying a flow corresponding to the flow information record 226.

The class ID 227 represents identification information (ID) for identifying a class corresponding to the flow information record 226.

The input-acceptable upper limit byte count 222 is information similar to the above-mentioned input-acceptable upper limit byte count 122. According to the second embodiment, the input-acceptable upper limit byte count 222 indicates an upper limit byte count writable in the respective time buffers (TBk) 241 for each of the flows and also each of the classes. For example, FIG. 10 illustrates an example of the input-acceptable upper limit byte count 222 which represents that the input packet where the class ID 227 becomes "1" among the input packets in the flow where the flow ID 221 becomes "#1" can be written in the respective time buffers (TBk) 241 up to 300 bytes. Similarly, for example, FIG. 10 illustrates an example of the input-acceptable upper limit byte count 222 which represents that the input packet where the class ID 227 becomes "2" among the input packets in the flow where the flow ID 221 becomes "#1" can be written in the respective time buffers (TBk) 241 up to 500 bytes. Similarly, for example, FIG. 10 illustrates an example of the input-acceptable upper limit byte count 222 which represents that the input packet where the class ID 227 becomes "b" among the input packets in the flow where the flow ID 221 becomes "#1" can be written in the respective time buffers (TBk) 241 up to 2000 bytes.

Alternatively, according to the second embodiment, the input-acceptable upper limit byte count 222 individually shows the upper limit byte count writable in the respective time buffers (TBk) 241 for each of the flows and also collectively shows in a class order from a higher priority. For example, FIG. 10 illustrates an example of the input-acceptable upper limit byte count 222 which represents that the input packet where the class ID 227 becomes smaller than or equal to "1" among the input packets in the flow where the flow ID 221 becomes "#1" can be written in the respective time buffers (TBk) 241 up to 300 bytes. Similarly, for example, FIG. 10 illustrates an example of the input-acceptable upper limit byte count 222 which represents that the input packet where the class ID 227 becomes smaller than or equal to "2" among the input packets in the flow where the flow ID 221 becomes "#1" can be written in the respective time buffers (TBk) 241 up to 500 bytes. Similarly, for example, FIG. 10 illustrates an example of the input-acceptable upper limit byte count 222 which represents that the input packet where the class ID 227 becomes smaller than or equal to "b" among the input packets in the flow where the flow ID 221 becomes "#1" can be written in the respective time buffers (TBk) 241 up to 2000 bytes.

It should be noted that in the input-acceptable upper limit byte count 222, a fixed byte count may also be set in accordance with a band (rate) of the respective flows and the respective classes. Alternatively, the input-acceptable upper limit byte count 222 may also be appropriately changed.

The excusable delay 223 is information similar to the above-mentioned excusable delay 123. According to the second embodiment, the excusable delay 223 represents an acceptable value of the delay time from a time when the input packet is newly written until a time when the relevant input packet is actually read out for each of the flows and also for each of the classes.

For example, FIG. 10 illustrates an example in which the excusable delay 223 of the input packet where the class ID 227 becomes "1" among the input packets in the flow where the flow ID 221 becomes "#1" is 30 milliseconds. Therefore, it is preferable that the input packet where the class ID 227 becomes "1" among the input packets in the flow where the flow ID 221 becomes "#1" is written in one of the n pieces of the time buffers (TBk) 241 if the delay time from a time when the input packet is written and until a time when the input packet is actually read out is smaller than or equal to 30 milliseconds. On the other hand, it is preferable that the input packet where the class ID 227 becomes "1" among the input packets in the flow where the flow ID 221 becomes "#1" is not written in any of the n pieces of the time buffers (TBk) 241 if the delay time from a time when the input packet is written and until a time when the input packet is actually read out exceeds 30 milliseconds (for example, discarded).

The next time buffer number 224 is information similar to the above-mentioned next time buffer number 124. According to the second embodiment, the next time buffer number 224 individually denotes an identification number of one time buffer (TBk) 241 in which the input packet should be written for each of the flows and also for each of the classes. For example, FIG. 10 illustrates an example of the next time buffer number 224 which represents that the input packet where the class ID 227 becomes "1" among the input packets in the flow where the flow ID 221 becomes "#1" should be written in the time buffer (TB1) 241.

The input-acceptable remaining byte count 225 is information similar to the above-mentioned input-acceptable remaining byte count 125. According to the second embodiment, the input-acceptable remaining byte count 225 denotes the remaining byte count writable in the one time buffer (TBk) 241 specified by the next time buffer number 224 for each of the flows and also for each of the classes. For example, FIG. 10 illustrates an example of the input-acceptable remaining byte count 225 which represents that the input packet where the class ID 227 becomes "1" among the input packets in the flow where the flow ID 221 becomes "#1" can be written in the time buffer (TBk) 241 specified by the next time buffer number 224 still up to 100 bytes remaining. Similarly, for example, FIG. 10 illustrates an example of the input-acceptable remaining byte count 225 which represents that the input packet where the class ID 227 becomes "b" among the input packets in the flow where the flow ID 221 becomes "#1" can be written in the time buffer (TBk) 241 specified by the next time buffer number 224 still up to 1520 bytes remaining.

Alternatively, according to the second embodiment, the input-acceptable remaining byte count 225 collectively shows the remaining byte counts writable in the one time buffer (TBk) 241 specified by the next time buffer number 224 for each of the flows individually and also in a higher priority class order. For example, FIG. 10 illustrates an example of the input-acceptable remaining byte count 225 which represents that the input packet where the class ID 227 becomes smaller than or equal to "1" among the input packets in the flow where the flow ID 221 becomes "#1" can be written in the time buffer (TBk) 241 specified by the next time buffer number 224 still up to 100 bytes remaining. Similarly, for example, FIG. 10 illustrates an example of the input-acceptable remaining byte count 225 which represents that the input packet where the class ID 227 becomes smaller than or equal to "b" among the input packets in the flow where the flow ID 221 becomes "#1" can be written in the time buffer (TBk) 241 specified by the next time buffer number 224 still up to 1520 bytes remaining.

As illustrated in FIG. 11, the buffer management table 23 is provided with a buffer management record 235 including a time buffer identification number 231, a class ID 236, a buffer upper limit value 232, a class upper limit value 237, a class queue length 233, an addition class 238, a determination queue length 239, and a reading out flag 234 the time buffer (TBk) 241 and also for each of the classes.

The time buffer identification number 231 is information similar to the above-mentioned time buffer identification number 131 and represents an identification number for identifying the time buffer (TBk) 241 corresponding to the buffer management record 235.

The class ID 227 represents identification information (ID) for identifying the class corresponding to the buffer management record 235.

The buffer upper limit value 232 is information similar to the above-mentioned buffer upper limit value 132 and denotes the upper limit byte count writable in the respective time buffers (TBk) 241.

The class upper limit value 237 collectively shows the upper limit byte counts writable in the respective time buffers (TBk) 241 in a higher priority class order. To elaborate, the class upper limit value 237 collectively shows the upper limit byte counts writable in each of the b pieces of the buffers 2412 for the class j provided to the respective time buffers (TBk) 241 in a higher priority class order. For example, FIG. 11 illustrates an example of the buffer upper limit value 232 which represents that with respect to the time buffer (TB1) 241, the input packet where the class ID 236 becomes smaller than or equal to "1" can be written up to 70000 bytes, the input packet where the class ID 236 becomes smaller than or equal to "2" can be written up to 100000 bytes, and the input packet where the class ID 236 becomes smaller than or equal to "b" can be written up to 125000 bytes.

The class queue length 233 is information similar to the above-mentioned queue length 133. According to the second embodiment, the class queue length 233 denotes the byte count of the input packet already written in the respective time buffers (TBk) 241 for each of the classes. To elaborate, the class queue length 233 denotes a byte count of the input packet already written in each of the b pieces of the buffers 2412 for the class j provided to the respective time buffers (TBk) 241. For example, FIG. 11 illustrates an example of the class queue length 233 which represents that with respect to the time buffer (TB1) 241, the input packet where the class ID 236 becomes "1" is already written for 34000 bytes, the input packet where the class ID 236 becomes "2" is already written for 12000 bytes, and the input packet where the class ID 236 becomes "b" is already written for 117800 bytes.

The addition class 238 represents the class ID 236 for identifying the class queue length 233 used for calculating the determination queue length 239. To be specific, the addition class 238 represents the class ID 236 for identifying the class queue length 233 added for calculating the determination queue length 239.

The determination queue length 239 has a value obtained by adding the class queue length 233 corresponding to the class ID 236 represented by the addition class 238. For example, FIG. 11 illustrates an example in which the determination queue length 239 of the time buffer (TB1) corresponding to the class ID 236 of "1" becomes a value "3400" of the class queue length 233 where the class ID 236 becomes "1". Similarly, for example, FIG. 11 illustrates an example in which the determination queue length 239 of the time buffer (TB1) corresponding to the class ID 236 of "2" becomes a value "15400" that is a sum of "3400" and "12000" which are the values of the class queue length 233 where the class ID 236 becomes "1" or "2". Similarly, for example, FIG. 11 illustrates an example in which the determination queue length 239 of the time buffer (TB1) corresponding to the class ID 236 of "b" becomes a value "143500" that is a sum of "3400", "12000", ..., and "117800" which are the values of the class queue length 233 where the class ID 236 becomes "1", "2", ..., or "b".

The reading out flag 234 is information similar to the above-mentioned reading out flag 134 and is a flag for identifying one time buffer (TBk) 241 presently in the reading out among the n pieces of the time buffers (TBk) 241.

(2-3) Operation by Packet Shaping Apparatus

Figure 12:
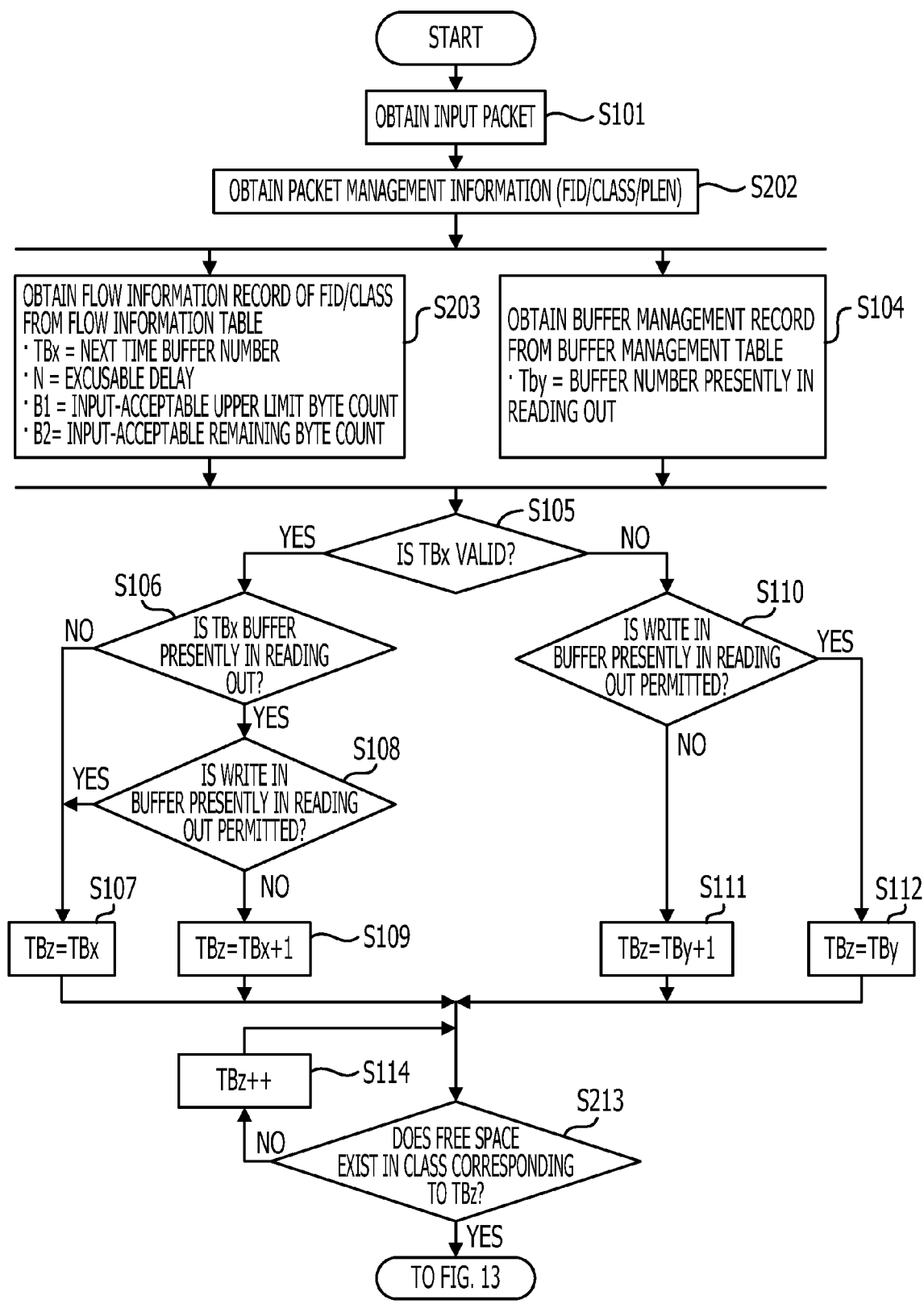
FIG. 12 is a flow chart illustrating a flow of a part of an operation by the packet shaping apparatus according to the second embodiment.
Figure 13:
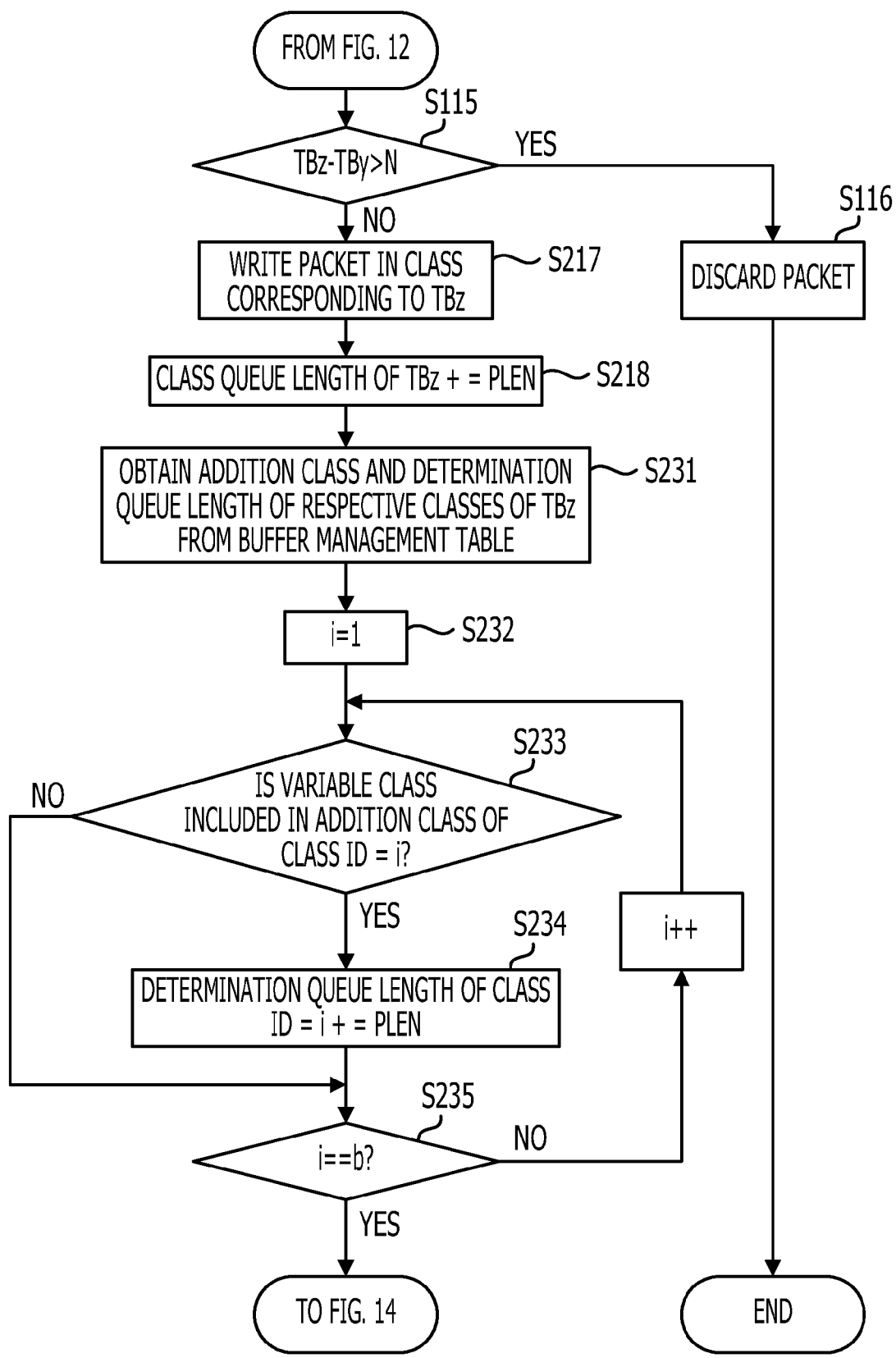
FIG. 13 is a flow chart illustrating a flow of another part of the operation by the packet shaping apparatus according to the second embodiment.
Figure 14:
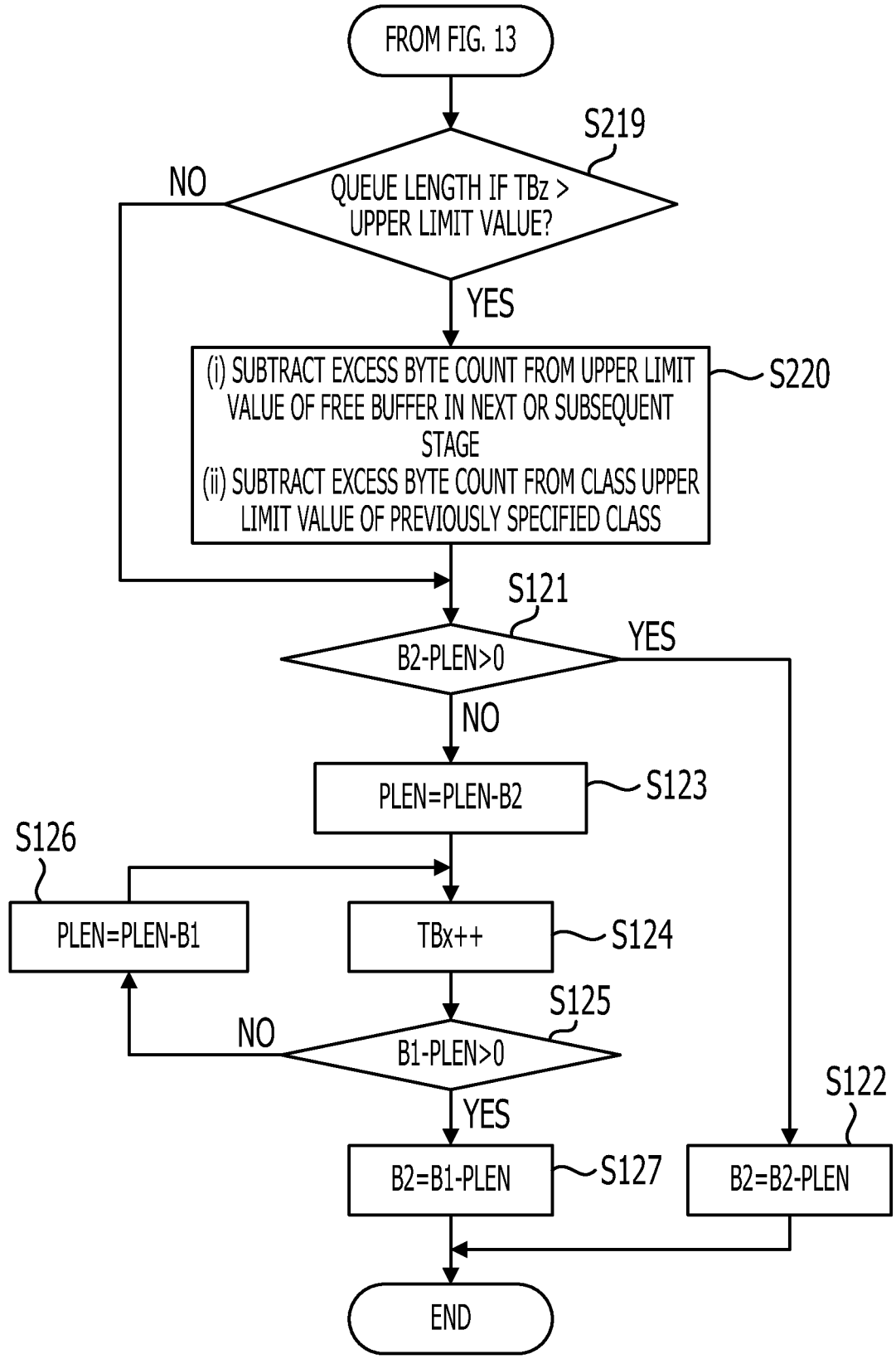
FIG. 14 is a flow chart illustrating a flow of another part of the operation by the packet shaping apparatus according to the second embodiment.

With reference to FIG. 12 to FIG. 14, a description will be made on an operation by the packet shaping apparatus 2 according to the second embodiment. FIG. 12 is a flow chart illustrating a flow of a part of the operation by the packet shaping apparatus 2 according to the second embodiment. FIG. 13 is a flow chart illustrating a flow of another part of the operation by the packet shaping apparatus 2 according to the second embodiment. FIG. 14 is a flow chart illustrating a flow of another part of the operation by the packet shaping apparatus 2 according to the second embodiment.

As illustrated in FIG. 12, the per-flow shaper unit 21 obtains an input packet (S101). After that, the per-flow shaper unit 21 obtains packet management information included in the obtained input packet (S202). The packet management information includes, for example, a variable FID (flow ID) for identifying a flow of the input packet, a variable CLASS (class ID) for identifying a class of the input packet, a variable PLEN (Packet LENgth) indicating a size of the input packet (byte count), and the like.

After that, the per-flow shaper unit 21 obtains the flow information record 226 having the flow ID 221 matched with the FID obtained in S202 and the class ID 227 matched with the CLASS obtained in S202 from the flow information table 22 (S203). Hereinafter, like the first embodiment, notations such as "the variable TBx", "the variable N", "the variable B1", and "the variable B2" are used.

Subsequent to the operation in S203, in tandem or in parallel, the per-flow shaper unit 21 obtains the buffer management record 235 from the buffer management table 23 (S104). For example, by obtaining the reading out flag 234, the per-flow shaper unit 21 recognizes the time buffer (TBk) 241 presently in the reading out. Hereinafter, like the first embodiment, the notation "the variable TBy" is used.

Subsequently, the per-flow shaper unit 21 sets a time buffer (TBz) 241 that becomes a candidate in which the input packet obtained in S101 should be written by performing an operation similar to that of the first embodiment (to be specific, the operation from S105 to S112).

Subsequently, the per-flow shaper unit 21 determines whether or not a free space corresponding to the class of the input packet exists in the time buffer (TBz) 241 (S213). To elaborate, the per-flow shaper unit 21 determines whether or not a free space exists in at least one the buffer 2412 for the class j corresponding to the class of the input packet among the b pieces of the buffers 2412 for the class j provided to the time buffer (TBz) 241. To be specific, the per-flow shaper unit 21 obtains the buffer management record 235 where the time buffer identification number 231 becomes "TBz" and also the class ID 236 becomes "CLASS" from the buffer management table 23. The per-flow shaper unit 21 determines whether or not the determination queue length 239 of the obtained buffer management record 235 is smaller than the class upper limit value 237. In a case where it is determined that the determination queue length 239 is smaller than the class upper limit value 237, the per-flow shaper unit 21 may determine that the free space corresponding to the class of the input packet exists in the time buffer (TBz) 241. On the other hand, in a case where it is determined that the determination queue length 239 is not smaller than the class upper limit value 237, the per-flow shaper unit 21 may determine that the free space corresponding to the class of the input packet exists in does not exist in the time buffer (TBz) 241.

As a result of the determination in S213, in a case where it is determined that the free space corresponding to the class of the input packet does not exist in the time buffer (TBz) 241 (S213: No), after TBz (in other words, z) is incremented by 1 (S114), the per-flow shaper unit 21 repeatedly performs the operation in S213.

On the other hand, as a result of the determination in S213, in a case where it is determined that the free space corresponding to the class of the input packet exists in the time buffer (TBz) 241 (S213: Yes), the per-flow shaper unit 21 performs an operation illustrated in FIG. 13.

As illustrated in FIG. 13, the per-flow shaper unit 21 determines whether or not a difference between a read time of the time buffer (TBz) 241 that becomes a candidate in which the input packet should be written and a read time of the time buffer (TBy) 241 presently in the reading out is larger than the variable N (that is, the excusable delay 223) (S115).

As a result of the determination in S115, in a case where it is determined that TBz−TBy (that is, the delay time) is larger than the variable N (S115: Yes), the per-flow shaper unit 21 discards the input packet obtained in S101 (S116). After that, the packet shaping apparatus 2 may end the operation or repeatedly perform the operation again in and after S101 of FIG. 12.

On the other hand, as a result of the determination in S115, in a case where it is determined that TBz−TBy (that is, the delay time) is not larger than the variable N (S115: No), the per-flow shaper unit 21 writes the input packet obtained in S101 in an area corresponding to the class of the input packet among the time buffers (TBz) 241 (S217). To be more specific, the per-flow shaper unit 21 writes the input packet obtained in S101 in the buffer 2412 for the class j (where j=CLASS) provided to the time buffer (TBz) 241.

Subsequently, the per-flow shaper unit 21 updates the class queue length 233 of the buffer management record 235 where the time buffer identification number 231 becomes "TBz" and also the class ID 236 becomes "CLASS" (S218). To be specific, the per-flow shaper unit 21 writes a value obtained by adding the variable PLEN (that is, the size of the input packet written in this time (byte count)) to the class queue length 233 before the update in the buffer management table 23 as the queue length 233 before the update.

Subsequently, the per-flow shaper unit 21 obtains the addition class 238 and the determination queue length 239 of the respective classes included in the buffer management record 235 where the time buffer identification number 231 becomes "TBz" from the buffer management table 23 (S231). To elaborate, while the buffer management table 23 illustrated in FIG. 11 is taken as an example, the addition class 238 and the determination queue length 239 of each of the b pieces of the buffer management records 235 where the time buffer identification number 231 becomes "TBz" and also the class ID 236 becomes from "1" to "b" are obtained.

Subsequently, the per-flow shaper unit 21 sets a variable i as an initial value "1" (S232).

After that, the per-flow shaper unit 21 determines whether or not the addition class 238 of the buffer management record 235 where the time buffer identification number 231 becomes "TBz" and also the class ID 236 becomes "i" includes a variable CLASS (S233).

As a result of the determination in S233, in a case where it is determined that the addition class 238 where the buffer management record 235 where the class ID 236 becomes "i" includes the variable CLASS (S233: Yes), the per-flow shaper unit 21 updates the determination queue length 239 (S234). To be specific, the per-flow shaper unit 21 updates the determination queue length 239 of the buffer management record 235 where the time buffer identification number 231 becomes "TBz" and also the class ID 236 becomes "i". At this time, the per-flow shaper unit 21 writes a value obtained by adding the variable PLEN (that is, the size of the input packet written in this time (byte count)) to the determination queue length 239 before the update in the buffer management table 23 as the determination queue length 239 after the update.

On the other hand, as a result of the determination in S233, in a case where it is determined that the addition class 238 of the buffer management record 235 where the class ID 236 in the buffer management table 23 "i" does not include the variable CLASS (S233: No), the per-flow shaper unit 21 may not necessarily perform the operation in S234.

After that, the per-flow shaper unit 21 determines whether or not the variable i is matched with the number of types of the classes (that is, the number of the buffers 2412 for the class j) b (that is, whether or not i=b is established) (S235).

As a result of the determination in S235, in a case where the variable i is not matched with the number of types b of the classes (S235: No), the variable i is incremented by 1 (S236), and the per-flow shaper unit 21 repeatedly performs the operation in S233.

On the other hand, as a result of the determination in S235, the variable i is matched with the number of types b of the classes (S235: Yes), the per-flow shaper unit 21 performs an operation illustrated in FIG. 14.

As illustrated in FIG. 14, the per-flow shaper unit 21 determines whether or not the total sum of the class queue lengths 233 of the buffer management record 235 where the time buffer identification number 231 becomes "TBz" is larger than the buffer upper limit value 232 of the buffer management record 235 where the time buffer identification number 231 becomes "TBz" (S219).

As a result of the determination in S219, in a case where it is determined that the total sum of the class queue lengths 233 is larger than the buffer upper limit value 232 (S219: Yes), the per-flow shaper unit 21 updates the buffer upper limit value 232 of the time buffer (TBz+a (where a is an integer satisfying 1≤a≤n)) 241 having the free space in the next or subsequent stage of the time buffer (TBz) (S220). To be specific, the per-flow shaper unit 21 subtracts the byte count by which the total sum of the class queue lengths 233 exceeds the buffer upper limit value 232 from the buffer upper limit value 232 of the buffer management record 235 where the time buffer number becomes "TBz+a". The per-flow shaper unit 21 writes the value obtained as the result of the subtraction in the buffer management table 23 as the buffer upper limit value 232 after the update of the buffer management record 235 where the time buffer identification number 231 becomes "TBz+a".

In addition, as a result of the determination in S219, in a case where it is determined that the total sum of the class queue lengths 233 is larger than the buffer upper limit value 232 (S219: Yes), the per-flow shaper unit 21 updates the class upper limit value 237 of the class of the time buffer (TBz+a) 241 having the free space in the next or subsequent stage of the time buffer (TBz) and also that is the previously specified class (S220). To be specific, the per-flow shaper unit 21 subtracts the byte count by which the total sum of the class queue lengths 233 exceeds the buffer upper limit value 232 from the class upper limit value 237 of the buffer management record 235 where the time buffer number becomes "TBz+a" and also corresponding to the previously specified class. The per-flow shaper unit 21 writes the value obtained as the result of the subtraction in the buffer management table 23 as the class upper limit value 237 after the update of the buffer management record 235 where the time buffer identification number 231 becomes "TBz+a" and also corresponding to the previously specified class.

It should be noted that "previous specification on class" in S220 may be carried out arbitrarily by the per-flow shaper unit 21 or through an instruction of a user or an operator of the packet shaping apparatus 2. In either case, the class where the exceeding byte count is subtracted may previously be specified through any method.

On the other hand, as a result of the determination in S219, in a case where it is determined that the total sum of the class queue lengths 233 is not larger than the buffer upper limit value 232 (S219: No), the per-flow shaper unit 21 may not necessarily perform the operation in S220.

Subsequently, the per-flow shaper unit 21 performs an operation similar to the first embodiment (to be specific, an operation from S121 to S127) on the flow information record 226 where the class ID 227 becomes "CLASS". As a result, the flow information table 22 including the flow information record 226 where the class ID 227 becomes "CLASS" is updated.

As described above, with the packet shaping apparatus 2 according to the second embodiment, the operation performed by the packet shaping apparatus 1 according to the first embodiment can be carried out while further making a distinction for each class of the input packet. For this reason, while making the distinction for each class, the packet shaping apparatus 2 according to the second embodiment appropriately can enjoy an effect similar to the effect enjoyed by the packet shaping apparatus 1 according to the first embodiment.

For example, it is possible to appropriately perform the shaping on both an input packet in a service where a tolerance to the delay is relatively small (for example, sound traffic) and the tolerance to an input packet in a service where the delay is relatively large (for example, data communication traffic) while taking into account the class corresponding to each of the services. To be more specific, for example, it is possible to write the sound traffic in the buffer 2412 for the class 1 having a high priority and also write the data communication traffic in the buffer 2412 for the class 2 having a relatively low priority. As a result, the sound traffic hardly suffers the delay or does not suffer the delay at all from the congestion in the data communication traffic.

(2-4) Modified Operation Example

Subsequently, with reference to FIG. 15 to FIG. 19, a description will be made on a modified operation example performed by the packet shaping apparatus 2 according to the second embodiment.

(2-4-1) Data Structures of Flow Information Table and Buffer Management Table

With reference to FIG. 15 and FIG. 16, a description will be made on data structures of a flow information table 32 and a buffer management table 33 used in the modified operation example. FIG. 15 is a table diagram of the data structure of the flow information table 32 used in the modified operation example. FIG. 16 is a table diagram of the data structure of the buffer management table 33 used in the modified operation example.

As illustrated in FIG. 15, like the above-mentioned flow information table 12, the flow information table 32 used in the modified operation example is provided with a flow information record 326 including a flow ID 321, a rate information 327, an input-acceptable upper limit byte count 322, an excusable delay 323, a next time buffer number 324, and an input-acceptable remaining byte count 325 for each of the flows.

The flow ID 321 is information similar to the above-mentioned flow ID 121 and represents identification information (ID) for identifying a flow corresponding to the flow information record 326.

The rate information 327 represents identification information (ID) for identifying a rate in the flow information record 326. It should be noted that according to the modified operation example, for the rate, two types including a high rate (HIGH) and a low rate (LOW) are used, but further more types of rates may also be used.

It should be noted that the "low rate" in the modified operation example represents, for example, a rate corresponding to the write of the input packet having a data amount at which the writing in the time buffer (TBk 241) is guaranteed at the very least. On the other hand, the "high rate" in the modified operation example represents, for example, a rate corresponding to the write of the input packet at an excess data amount separate from the data amount by which the writing in the time buffer (TBk 241) is guaranteed at the very least.

The input-acceptable upper limit byte count 322 is information similar to the above-mentioned input-acceptable upper limit byte count 122. According to the modified operation example, the input-acceptable upper limit byte count 322 denotes the upper limit byte count writable in the respective time buffers (TBk) 241 for each of the flows and also for each of the rates.

The excusable delay 323 is information similar to the above-mentioned excusable delay 123.

The next time buffer number 324 is information similar to the above-mentioned next time buffer number 124.

The input-acceptable remaining byte count 325 is information similar to the above-mentioned input-acceptable remaining byte count 125. According to the modified operation example, the input-acceptable remaining byte count 325 represents the remaining byte count writable in the one time buffer (TBk) 241 specified by the next time buffer number 324 for each of the flows and also for each of the rates.

As illustrated in FIG. 16, the buffer management table 33 is provided with a buffer management record 335 including a time buffer identification number 331, a time buffer threshold 332, a queue length 333, and the reading out flag 334 for each of the time buffers (TBk) 241.

The time buffer identification number 331 is information similar to the above-mentioned time buffer identification number 131.

The time buffer threshold 332 is information similar to the above-mentioned buffer upper limit value 132. It should be however noted that according to the modified operation example, the upper limit of each of the n pieces of the time buffers (TBk) 241 is preferably set as a value taking into account a predetermined margin (for example, a margin of a size equivalent to 1 packet) with respect to the maximum data amount that can be read out from the respective time buffers (TBk) 241 within the predetermined time T1. The time buffer threshold 332 represents a maximum data amount that can be read out from the time buffer (TBk) 241 within the predetermined time T1 (that is, an upper limit size which does not take into account the margin) instead of the upper limit size of the time buffer (TBk) 241 (that is, the upper limit size taking into account the margin).

The queue length 333 is information similar to the above-mentioned queue length 133.

The reading out flag 334 is information similar to the above-mentioned reading out flag 134.

(2-4-2) Operation by Packet Shaping Apparatus

Figure 17:
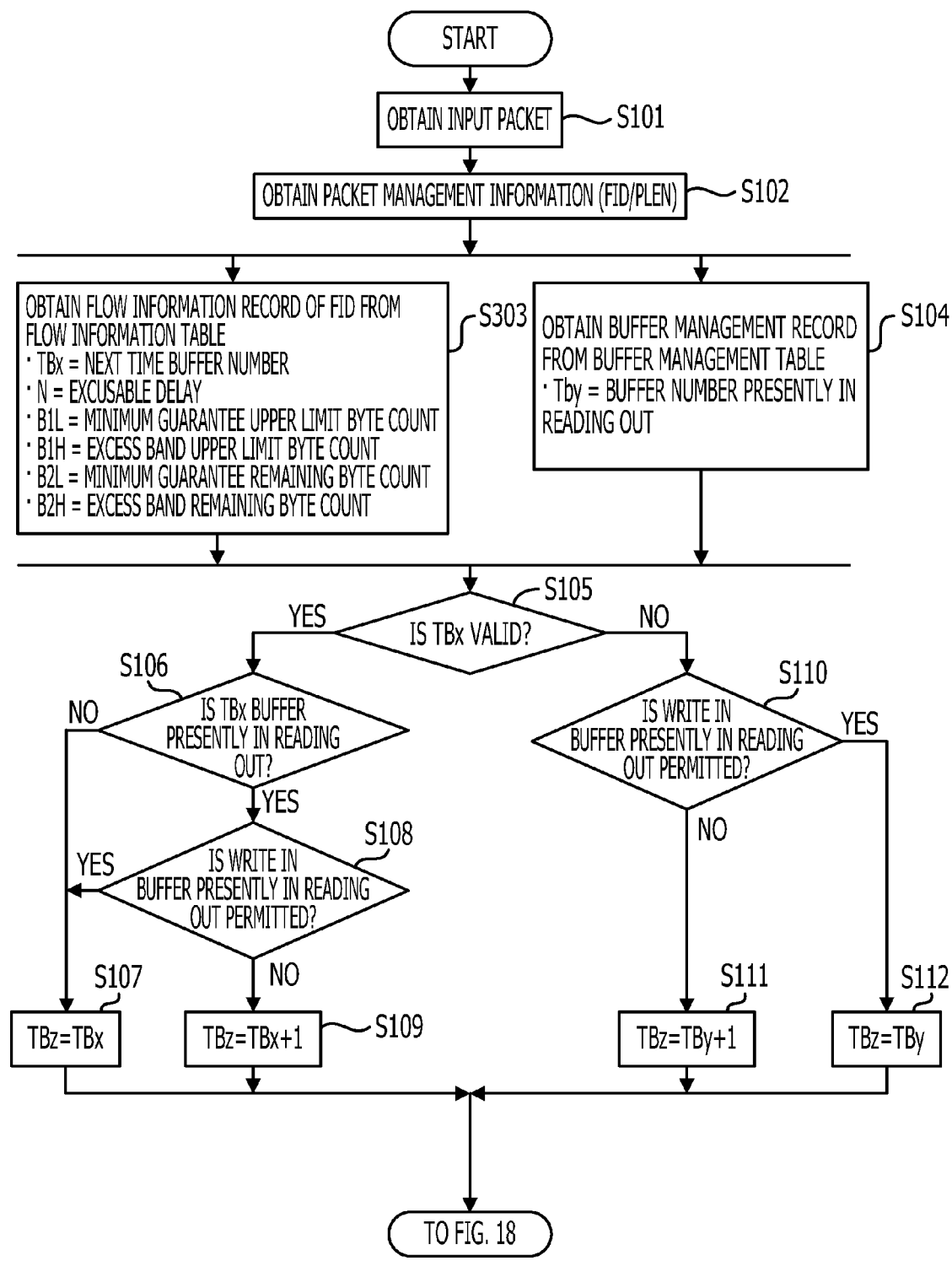
FIG. 17 is a flow chart illustrating a flow of a part of the modified operation example by the packet shaping apparatus according to the second embodiment.
Figure 18:
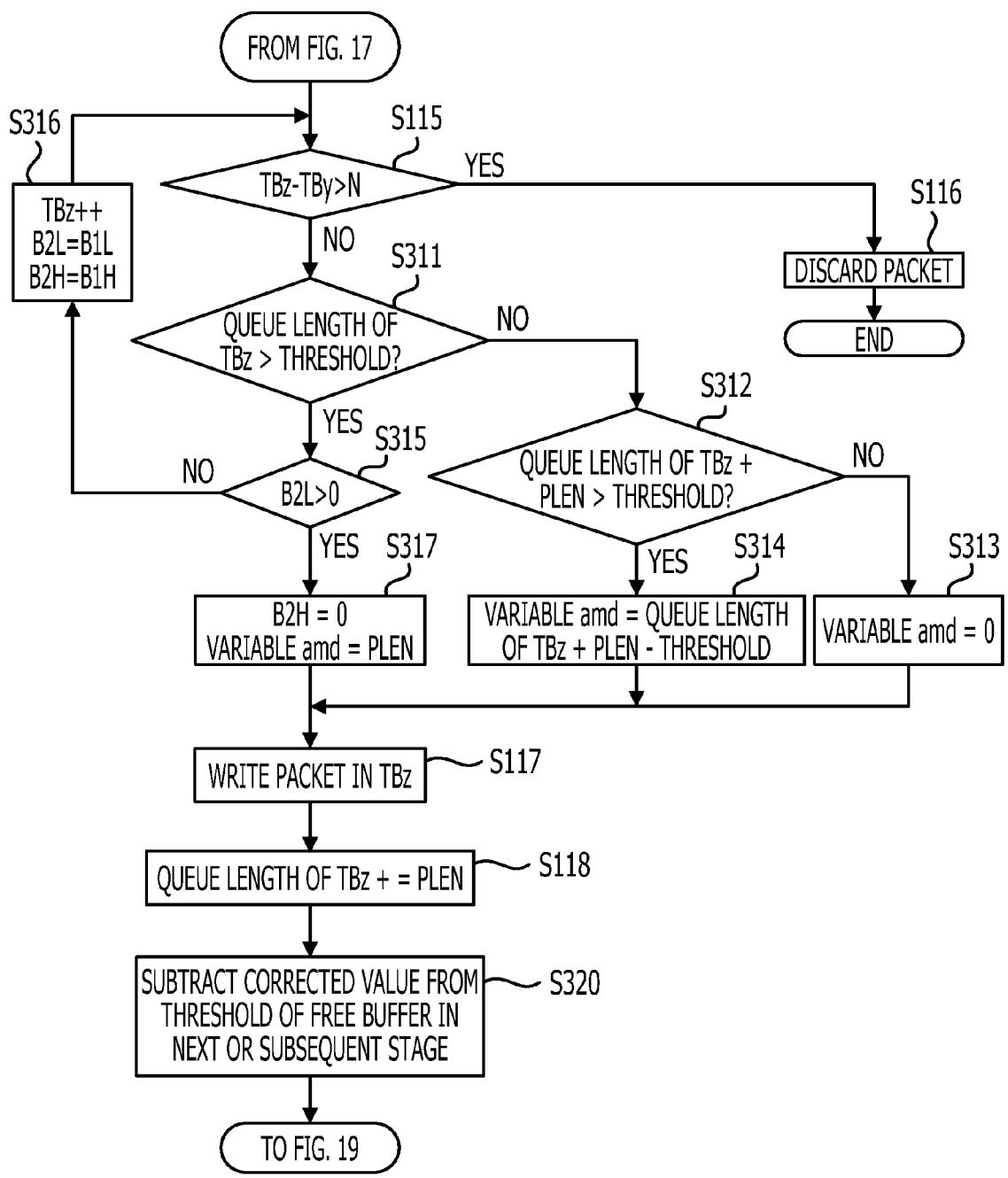
FIG. 18 is a flow chart illustrating a flow of another part of the modified operation example by the packet shaping apparatus according to the second embodiment.

With reference to FIG. 17 to FIG. 19, a description will be made on a modified operation example by the packet shaping apparatus 2 according to the second embodiment. FIG. 17 is a flow chart illustrating a flow of a part of the modified operation example by the packet shaping apparatus 2 according to the second embodiment. FIG. 18 is a flow chart illustrating a flow of another part of the modified operation example by the packet shaping apparatus 2 according to the second embodiment. FIG. 19 is a flow chart illustrating a flow of another part of the modified operation example by the packet shaping apparatus 2 according to the second embodiment.

As illustrated in FIG. 17, the per-flow shaper unit 21 obtains an input packet (S101). After that, the per-flow shaper unit 21 obtains packet management information included in the obtained input packet (S102). The packet management information includes, for example, a variable FID (flow ID) for identifying a flow of the input packet, a variable PLEN (Packet LENgth) indicating a size of the input packet (byte count), and the like.

After that, the per-flow shaper unit 21 obtains the flow information record 326 having the flow ID 321 matched with the FID obtained in S102 from the flow information table 32 (S303). Hereinafter, like the first embodiment, the notations "the variable TBx" and "the variable N" are used. In addition, the input-acceptable upper limit byte count 322 included in the flow information record 326 and also corresponding to the low rate is appropriately referred to as "minimum guarantee upper limit byte count" and also denoted as "variable B1L". Similarly, the input-acceptable upper limit byte count 322 included in the flow information record 326 and also corresponding to the high rate is appropriately referred to as "excess band upper limit byte count" and also denoted as "variable B1H". Similarly, the input-acceptable remaining byte count 325 included in the flow information record 326 and also corresponding to the low rate is appropriately referred to as "minimum guarantee remaining byte count" and also denoted as "the variable B2L". Similarly, the input-acceptable remaining byte count 325 included in the flow information record 326 and also corresponding to the high rate is appropriately referred to as "excess band remaining byte count" and also denoted as "the variable B2H".

Subsequent to the operation in S303, in tandem or in parallel, the per-flow shaper unit 21 obtains the buffer management table 33 from the buffer management record 335 (S104). For example, by obtaining the reading out flag 334, the per-flow shaper unit 21 recognizes the time buffer (TBk) 241 presently in the reading out. Hereinafter, like the first embodiment, the notation "the variable TBy" is used.

Subsequently, by performing an operation similar to the first embodiment (to be specific, the operation from S105 to S112), the per-flow shaper unit 21 sets the time buffer (TBz) 241 obtained in S101 that becomes a candidate in which the input packet should be written. After that, the per-flow shaper unit 21 performs an operation illustrated in FIG. 18.

As illustrated in FIG. 18, the per-flow shaper unit 21 determines whether or not a difference between a read time of the time buffer (TBz) 241 that becomes a candidate in which the input packet should be written and a read time of the time buffer (TBy) 241 presently in the reading out is larger than the variable N (that is, the excusable delay 323) (S115).

As a result of the determination in S115, in a case where it is determined that TBz−TBy (that is, the delay time) is larger than the variable N (S115: Yes), the per-flow shaper unit 21 discards the input packet obtained in S101 (S116). After that, the packet shaping apparatus 2 may end the operation or repeatedly perform the operation again in and after S101 of FIG. 17.

On the other hand, as a result of the determination in S115, in a case where it is determined that TBz−TBy (that is, the delay time) is not larger than the variable N (S115: No), the per-flow shaper unit 21 determines whether or not the queue length 333 of the buffer management record 335 where the time buffer identification number 331 becomes "TBz" is larger than the time buffer threshold 332 of the buffer management record 335 where the time buffer identification number 331 becomes "TBz" (S311). To elaborate, the per-flow shaper unit 21 determines whether or not a free space exists in the time buffer (TBz) 241 that becomes a candidate in which the input packet should be written.

As a result of the determination in S311, in a case where it is determined that the queue length 333 is not larger than the time buffer threshold 332 (S311: No), the per-flow shaper unit 21 determines whether or not a value obtained by adding the variable PLEN to the queue length 333 of the buffer management record 335 where the time buffer identification number 331 becomes "TBz" is larger than the time buffer threshold 332 of the buffer management record 335 where the time buffer identification number 331 becomes "TBz" (S312). To elaborate, the per-flow shaper unit 21 determines whether or not a free space enough to write in the input packet having the size of PLEN exists in the time buffer (TBz) 241 that becomes a candidate in which the input packet should be written.

As a result of the determination in S312, in a case where it is determined that the value obtained by adding the variable PLEN to the queue length 333 is not larger than the time buffer threshold 332 (S312: No), the per-flow shaper unit 21 sets a variable amd representing a corrected value as "0" (S313). It should be noted that "the corrected value amd" in the modified operation example is equivalent, for example, to an excess amount in a case where the input packet is written in while exceeding the upper limit value which does not take into account the margin of the time buffer (TBk) 241 (to be specific, the maximum data amount that can be read out within the predetermined time T1). In a case where the operation in S313 is carried out, even after the input packet is written, the queue length 333 (that is, the queue length 333 before the update+PLEN) does not exceed the time buffer threshold 332. For this reason, the corrected value amd becomes "0".

On the other hand, as a result of the determination in S312, in a case where it is determined that the value obtained by adding the variable PLEN to the queue length 333 is larger than the time buffer threshold 332 (S312: No), the per-flow shaper unit 21 sets the corrected value amd as "the queue length 333 of the buffer management record 335 where the time buffer identification number 331 becomes "TBz"+ PLEN−the time buffer threshold 332 of the buffer management record 335 where the time buffer identification number 331 becomes "TBz"" (S314). To be specific, in a case where the operation in S313 is carried out, after the input packet is written, the queue length 333 (that is, the queue length 333 before the update+PLEN) exceeds the time buffer threshold 332. For this reason, the corrected value amd becomes "a size of a part of the input packet written in while exceeding the time buffer threshold 332 (that is, the queue length before the update+PLEN−buffer threshold)".

On the other hand, as a result of the determination in S311, in a case where it is determined that the queue length 333 is larger than the time buffer threshold 332 (S311: Yes), the per-flow shaper unit 21 determines whether or not the variable B2L is larger than 0 (S315). To elaborate, the per-flow shaper unit 21 determines whether or not the input packet having the data amount at which the writing in is guaranteed at the very least is already written in the time buffer (TBz) 241.

As a result of the determination in S315, in a case where it is determined that the variable B2L is not larger than 0 (S315: No), it is supposed that the input packet is already written in the time buffer (TBz) 241 by the data amount larger than or equal to the data amount at which the writing in is guaranteed at the very least. Therefore, TBz (in other words, z) is incremented by 1 (S316), and the per-flow shaper unit 21 repeatedly performs the operation in S115. To elaborate, the per-flow shaper unit 11 sets the time buffer (TBz+1) 241 in the next stage of the time buffer (TBz) 241 where it is determined that the input packet is already written in by the data amount larger than or equal to the data amount at which the writing in is guaranteed at the very least as a new time buffer (TBz) 241, and the operation in S115 is repeatedly performed. It should be noted that the per-flow shaper unit 21 increments TBz by 1, sets the variable B2L as the variable B1L, and also sets the variable B2H as the variable B1H (S316). To elaborate, the per-flow shaper unit 21 sets the old variable B1L as the new variable B2L and also sets the old variable B1H as the new variable B2H.

On the other hand, as a result of the determination in S315, in a case where it is determined that the variable B2L is larger than 0 (S315: No), it is supposed that the input packet is written in the time buffer (TBz) 241 only by the data amount smaller than the data amount at which the writing in is guaranteed at the very least. Therefore, in this case, it is determined that the input packet is written in the time buffer (TBz) 241. Therefore, the per-flow shaper unit 21 sets the corrected value amd as a size "PLEN" of the input packet written this time (S317). It should be however noted that In this case, it is preferable to deal with that the time buffer (TBz) 241 does not an area in which the excess input packet is written. Therefore, the per-flow shaper unit 21 sets the variable B2H as "0" (S317).

After that, the per-flow shaper unit 21 writes the input packet obtained in S101 in the time buffer (TBz) 241 (S117).

Subsequently, the per-flow shaper unit 21 updates the queue length 333 of the buffer management record 335 where the time buffer identification number 331 becomes "TBz" (S118). To be specific, the per-flow shaper unit 21 writes a value obtained by adding the variable PLEN (that is, the size of the input packet written in this time (byte count)) to the queue length 333 before the update in the buffer management table 33 as the queue length 333 after the update.

In addition, the per-flow shaper unit 21 updates the time buffer threshold 332 of the time buffer (TBz+a) 241 having the free space in the next or subsequent stage of the time buffer (TBz) 241 (S320). To be specific, the per-flow shaper unit 21 subtracts the variable amd representing the corrected value from the time buffer threshold 332 of the buffer management record 335 where the time buffer identification number 331 becomes "TBz+a". The per-flow shaper unit 21 writes the value obtained as the result of the subtraction in the buffer management table 33 as the time buffer threshold 332 after the update of the buffer management record 335 where the time buffer identification number 331 becomes "TBz+a".

It should be noted that the time buffer threshold 332 after the update of the buffer management record 335 where the time buffer identification number 331 becomes "TBz+a" is significantly smaller than the time buffer threshold 332 before the update (for example, in a case where the time buffer threshold 332 after the update/the time buffer threshold 332 before the update <0.5 is established), the following operation may be carried out. For example, the per-flow shaper unit 21 may subtract only a part of the corrected value amd from the time buffer threshold 332 of the buffer management record 335 where the time buffer identification number 331 becomes "TBz+a" and subtract only the other part of the corrected value amd from the time buffer threshold 332 of the buffer management record 335 where the time buffer identification number 331 becomes "TBz+a+1" (that is, in a further subsequent stage).

After that, by performing the operation illustrated in FIG. 19, the per-flow shaper unit 21 performs the update operation of the flow information table 32 (from S321 to S335). To be specific, the per-flow shaper unit 21 determines whether or not the variable B2L (that is, the input-acceptable remaining byte count 325) is larger than the variable PLEN (that is, the size of the input packet written in this time (byte count)) (S321).

As a result of the determination in S321, in a case where it is determined that the variable B2L is larger than the variable PLEN (S321: Yes), the per-flow shaper unit 21 updates the variable B2L (that is, the input-acceptable remaining byte count 325) (S322). To be specific, the per-flow shaper unit 21 writes the value obtained by subtracting the variable PLEN from the variable B2L in the flow information table 32 as the variable B2L after the update (that is, the input-acceptable remaining byte count 325 after the update). After that, the packet shaping apparatus 2 may end the operation or repeatedly perform the operation again in and after S101 of FIG. 17.

On the other hand, as a result of the determination in S321, in a case where it is determined that the variable B2L is not larger than the variable PLEN (S321: No), the per-flow shaper unit 21 updates the variable PLEN and the variable B2L (S323). To be specific, the per-flow shaper unit 21 sets the value obtained by subtracting the variable B2L before the update from the variable PLEN as the variable PLEN after the update. In addition, the per-flow shaper unit 21 writes "0" in the flow information table 32 as the variable B2L after the update.

Subsequently, the per-flow shaper unit 21 determines whether or not the variable B2H (that is, the input-acceptable remaining byte count 325) is larger than the variable PLEN (that is, the size of the input packet written in this time (byte count)) (S331).

As a result of the determination in S331, in a case where it is determined that the variable B2H is larger than the variable PLEN (S331: Yes), the per-flow shaper unit 21 updates the variable B2H (that is, the input-acceptable remaining byte count 325) (S332). To be specific, the per-flow shaper unit 21 writes the value obtained by subtracting the variable PLEN from the variable B2H in the flow information table 32 as the variable B2H after the update (that is, the input-acceptable remaining byte count 325 after the update). After that, the packet shaping apparatus 2 may end the operation or repeatedly perform the operation again in and after S101 of FIG. 17.

On the other hand, as a result of the determination in S331, in a case where it is determined that the variable B2H is not larger than the variable PLEN (S331: No), the per-flow shaper unit 21 updates the variable TBx (that is, the next time buffer number 324), the variable PLEN, and the variable B2L (S324). To be specific, the per-flow shaper unit 21 writes the value obtained by incrementing the variable TBx (in other words, x) by 1 in the flow information table 32 as the next time buffer number 324 after the update. To elaborate, the per-flow shaper unit 21 deals with the time buffer (TBx+1) 241 that is in the next stage of the time buffer (TBx) 241 as the new time buffer (TBx) 241. In addition, the per-flow shaper unit 21 sets the value obtained by subtracting the variable B2H before the update from the variable PLEN as the variable PLEN after the update. In addition, the per-flow shaper unit 21 writes the variable B1L in the flow information table 32 as the variable B2L after the update.

Subsequently, the per-flow shaper unit 21 determines whether or not the queue length 333 of the buffer management record 335 where the time buffer identification number 331 becomes "TBx" is larger than the time buffer threshold 332 of the buffer management record 335 where the time buffer identification number 331 becomes "TBx" (S333). To elaborate, the per-flow shaper unit 21 determines whether or not a free space exists in the time buffer after the update (TBx) 241 (that is, the new time buffer (TBz) 241 that becomes a candidate in which the input packet should be written).

As a result of the determination in S333, in a case where it is determined that the queue length 333 is larger than the time buffer threshold 332 (S333: Yes), it is supposed that no margin exists for performing the further write of the excess band. Therefore, the per-flow shaper unit 21 updates the variable B2H (that is, the input-acceptable remaining byte count 325) (S334). To be specific, the per-flow shaper unit 21 writes "0" in the flow information table 32 as the variable B2H after the update. After that, the per-flow shaper unit 21 repeatedly performs the operation in and after S321.

On the other hand, as a result of the determination in S333, in a case where it is determined that the queue length 333 is not larger than the time buffer threshold 332 (S311: No), the per-flow shaper unit 21 updates the variable B2H (that is, the input-acceptable remaining byte count 325) (S335). To be specific, the per-flow shaper unit 21 writes the variable B1 H in the flow information table 32 as the variable B2H after the update. After that, the per-flow shaper unit 21 repeatedly performs the operation in and after S321.

As described above, according to the modified operation example, it is possible to enjoy an effect similar to the effect enjoyed by the packet shaping apparatus 1 according to the first embodiment.

In addition, according to the modified operation example, in the traffic with the same priority (same class), services of a plurality of rates (for example, a minimum band guarantee service, a maximum band limiting service, and the like) can be supported. To be specific, for example, even in a case where the queue length 333 reaches the original upper limit (that is, the time buffer threshold 332), the minimum guarantee input packet can be written in the time buffer (TBz) 241. For this reason, even in a case where the congestion occurs, it is possible to guarantee the minimum band. On the other hand, in a case where the congestion does not occur, as the excess band input packet in addition to the minimum guarantee input packet can be written in the respective flows, it is possible to increase the transmission rate of the input packet.

According to an aspect of the embodiments of the invention, any combinations of one or more of the described features, functions, operations, and/or benefits can be provided. A combination can be one or a plurality. The embodiments can be implemented as an apparatus (a machine) that includes hardware for performing the described features, functions, operations, and/or benefits, for example, hardware to execute instructions, for example, computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software. The packet shaping apparatus 1 can comprise a controller (CPU) (e.g., a hardware logic circuitry based computer processor that processes or executes instructions, namely software/program), computer readable media, transmission communication interface (network interface), and/or an output device, for example, a display device, and which can be in communication among each other through one or more data communication buses. In addition, an apparatus can include one or more apparatuses in computer network communication with each other or other apparatuses. In addition, a computer processor can include one or more computer processors in one or more apparatuses or any combinations of one or more computer processors and/or apparatuses. An aspect of an embodiment relates to causing and/or configuring one or more apparatuses and/or computer processors to execute the described operations. The results produced can be output to an output device, for example, displayed on the display. An apparatus or device refers to a physical machine, for example, a computer (physical computing hardware or machinery) that implement or execute instructions, for example, by way of software, which is code executed by computing hardware, and/or by way of computing hardware (e.g., in circuitry, etc.), to achieve the functions or operations being described. The functions of embodiments described can be implemented in any type of apparatus that can execute instructions or code. More particularly, programming or configuring or causing an apparatus or device, for example, a computer, to execute the described functions of embodiments of the invention creates a new machine where in case of a computer a general purpose computer in effect becomes a special purpose computer once it is programmed or configured or caused to perform particular functions of the embodiments of the invention pursuant to instructions from program software.

A program/software implementing the embodiments may be recorded on a computer-readable media, e.g., a non-transitory or persistent computer-readable medium. Examples of the non-transitory computer-readable media include a magnetic recording apparatus, an optical disk, a magneto-optical disk, and/or volatile and/or non-volatile semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), DVD-ROM, DVD-RAM (DVD-Random Access Memory), BD (Blue-ray Disk), a CD-ROM (Compact Disc-Read Only Memory), and a CD-R (Recordable)/RW. The program/software implementing the embodiments may be transmitted over a transmission communication path, e.g., a wire and/or a wireless network implemented via hardware. An example of communication media via which the program/software may be sent includes, for example, a carrier-wave signal.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A shaping apparatus comprising:
    a plurality of buffers for which a data amount readable within a predetermined time is set as a writable upper limit size and the buffers from which read processing are carried out are sequentially switched on the predetermined time basis;
    a storage to store a flow information table including for flows of input data on a flow of input data basis specific information for specifying a buffer to write input data for a flow of input data, maximum amount information indicating a maximum data amount writable by the flow of input data in the buffer specified by the specific information, and remaining amount information indicating a remaining data amount writable by the flow of input data in the buffer specified by the specific information; and
    a shaper that writes the input data in the buffer specified by the specific information from among the plurality of buffers for each of the flows of the input data,
    wherein for each of the flows of the input data,
        the shaper updates the remaining amount information of the flow of the input data to a value obtained by subtracting a newly written data amount of the input data in the buffer specified for the flow of the input data from the remaining amount information before the input data is written in the buffer specified for the flow of the input data and
        repeatedly performs, when the remaining amount information after the update takes a negative value, each operation
            of updating the specific information to information for specifying a buffer in a next stage as a next buffer to the buffer specified by the specific information and
            of adding maximum amount information for a flow of input data in the next buffer to remaining amount information for the flow of input data in the next buffer each time the specific information is updated to the next buffer until the remaining amount information for the flow of input data in the buffer takes a positive value.

2. The shaping apparatus according to claim 1, further comprising a buffer management table including upper limit information indicating an upper limit size of the buffers respectively and queue length information indicating a total amount of the input data already written in the respective buffers for each of the plurality of buffers,
    wherein in a case where the queue length information before the input data is written does not exceed the upper limit information, the shaper determines that the input data can be written in the buffer specified by the specific information, and
    wherein for each of the flows, in a case where the input data can be written in the buffer specified by the specific information, the shaper writes the input data in the buffer specified by the specific information and in a case where the input data cannot be written in the buffer specified by the specific information, the shaper writes the input data in another writable buffer in a next stage to the buffer specified by the specific information.

3. The shaping apparatus according to claim 2, wherein in a case where the queue length information after the input data is written exceeds the upper limit information, the shaper writes the input data in the buffer specified by the specific information and also updates the upper limit information of another writable buffer in a next stage to the buffer specified by the specific information to a value obtained by subtracting a data amount by which the queue length information exceeds the upper limit information from the upper limit size of the next buffer.

4. The shaping apparatus according to claim 3, wherein each of the plurality of buffers has a size having a predetermined margin with respect to the upper limit size.

5. The shaping apparatus according to claim 1, wherein in a case where it is determined that the input data should be written in a buffer where the read processing is carried out after a time larger than or equal to an excusable delay time elapses while the buffer where the read processing is currently carried out is set as a reference, the shaper discards the input data.

6. The shaping apparatus according to claim 5, wherein the flow information table further includes delay time information indicating the excusable delay time for each of the flows of input data.

7. The shaping apparatus according to claim 1, wherein in a case where the buffer specified by the specific information is the buffer where the read processing is carried out, the shaper writes the input data in the buffer specified by the specific information.

8. The shaping apparatus according to claim 1, wherein in a case where the buffer specified by the specific information is the buffer where the read processing is carried out, the shaper writes the input data in another writable buffer in a next stage to the buffer specified by the specific information.

9. The shaping apparatus according to claim 1,
wherein at least one of the plurality of buffers is provided with a plurality of priority buffers corresponding to each of a plurality of types of priorities,
wherein the flow information table includes the specific information for specifying the buffer in which the input data should be written for each of the flows and for each of the priorities, the maximum amount information indicating the maximum data amount writable in each of the plurality of buffers for each of the flows and for each of the priorities, and the remaining amount information indicating the remaining data amount writable in the buffer specified by the specific information for each of the flows and for each of the priorities,
wherein for each of the flows and for each of the priorities of the input data, the shaper writes the input data in the priority buffer unit that is provided to the buffer specified by the specific information among the plurality of buffers and also corresponds to the priority of the input data, and
wherein for each of the flows and for each of the priorities, the shaper updates the remaining amount information to a value obtained by subtracting a newly written data amount of the input data from the remaining amount information before the input data is written and repeatedly performs, in a case where the remaining amount information after the update takes a negative value, each of an operation of updating the specific information to information for specifying another buffer in a next or subsequent stage of the buffer specified by the specific information and an operation of adding the maximum amount information to the remaining amount information each time is updated the specific information until the remaining amount information takes a positive value.

10. The shaping apparatus according to claim 9, further comprising:
a buffer management table for each of the plurality of buffers which includes upper limit information indicating an upper limit size of the respective buffers for each of the priorities and a queue length information indicating a total amount of data already written in the respective buffers for each of the priorities,
wherein the shaper determines that the input data can be written in the priority buffer unit that is provided to the buffer specified by the specific information and also corresponds to the priority of the input data in a case where the queue length information before the input data is written does not exceed the upper limit information, and
wherein for each of the flows and for each of the priorities, in a case where the input data can be written in the priority buffer unit that is provided to the buffer specified by the specific information and also corresponds to the priority of the input data, the shaper writes the input data in the priority buffer unit that is provided to the buffer specified by the specific information and also corresponds to the priority of the input data and in a case where the input data cannot be written in the priority buffer unit that is provided to the buffer specified by the specific information and also corresponds to the priority of the input data, the shaper writes the input data in the priority buffer unit that is provided to another writable buffer located in a next or subsequent stage of the buffer specified by the specific information the buffer specified by the specific information and also corresponds to the priority of the input data.

11. The shaping apparatus according to claim 10,
wherein at least one of the plurality of buffers sets a data amount obtained by adding a predetermined margin to a data amount that can be read out within the predetermined time as a writable upper limit size,
wherein the flow information table includes the maximum amount information and the remaining amount information while being associated with each of a minimum guarantee level at which the write is guaranteed at the very least as a data amount writable in each of the plurality of buffers and an excess band level at which an excess is secured as a data amount writable in each of the plurality of buffers,
wherein for each of the plurality of buffers, a buffer management table including threshold information indicating a data amount that can be read out within the predetermined time from the respective buffers and queue length information indicating a total amount of data already written in the respective buffers is further provided,
wherein in a case where the queue length information before the input data is written does not exceed the threshold information the queue length information before the input data is written exceeds the threshold information and also the remaining amount information corresponding to the minimum guarantee level has a positive value, the shaper determines that the input data can be written in the buffer specified by the specific information, and wherein in a case where the queue length information before the input data is written exceeds the threshold information and also the remaining amount information corresponding to the minimum guarantee level has a negative value, the shaper determines that the input data cannot be written in the buffer specified by the specific information, and wherein for each of the flows, in a case where the input data can be written in the buffer specified by the specific information, the shaper writes the input data in the buffer specified by the specific information and in a case where the input data cannot be written in the buffer specified by the specific information, the shaper writes the input data in another writable buffer located in a next or subsequent stage of the buffer specified by the specific information.

12. The shaping apparatus according to claim 11, wherein in a case where it is determined that the input data can be written in the buffer specified by the specific information and also the queue length information after the input data is written exceeds the threshold information, the shaper updates the threshold information of another writable buffer located in a next or subsequent stage of the buffer specified by the specific information to a value obtained by subtracting a data amount by which the queue length information exceeds the threshold information from the threshold information of the other buffer.

13. The shaping apparatus according to claim 11, wherein in a case where the input data cannot be written in the buffer specified by the specific information, the shaper updates the remaining amount information corresponding to the excess band level to the maximum amount information corresponding to the excess band level and also updates the remaining amount information corresponding to the minimum guarantee level to the maximum amount information corresponding to the minimum guarantee level.

14. A shaping method for a shaping apparatus including:
a plurality of buffers in which a data amount that can be read out within a predetermined time is set as a writable upper limit size and one buffer where a read processing is carried out is sequentially switched on the predetermined time basis; and
a flow information table including specific information for specifying a buffer in which input data should be written for each of flows of the input data, maximum amount information indicating a maximum data amount writable in each of the plurality of buffers for each of the flows, and remaining amount information indicating a remaining data amount writable in the buffer specified by the specific information for each of the flows, the shaping method comprising:
a write of writing the input data in the buffer specified by the specific information among the plurality of buffers for each of the flows of the input data; and
an update of updating the remaining amount information to a value obtained by subtracting a newly written data amount of the input data from the remaining amount information before the input data is written and repeatedly performing, in a case where the remaining amount information after the update takes a negative value, each of an operation of updating the specific information to information for specifying another buffer in a next or subsequent stage of the buffer specified by the specific information and an operation of adding the maximum amount information to the remaining amount information each time the specific information is updated until the remaining amount information takes a positive value for each of the flows.

15. A shaping apparatus comprising:
a plurality of buffers for which a data amount readable within a predetermined time is set as a writable upper limit size and the buffers from which read processing are carried out are sequentially switched on the predetermined time basis;
a storage to store a flow information table including for flows of input data, on a flow of input data basis, specific information for specifying a buffer to write input data for a flow of input data, maximum amount information indicating a maximum data amount writable for the flow of input data in the buffer specified by the specific information, and remaining amount information indicating a remaining data amount writable for the flow of input data in the buffer specified by the specific information; and
a shaper that writes the input data in the buffer specified by the specific information from among the plurality of buffers for each of the flows of the input data,
wherein for each of the flows of the input data,
the shaper updates the remaining amount information of the flow of the input data to a value obtained by subtracting a newly written data amount of the input data in the buffer specified for the flow of the input data from the remaining amount information before the input data is written in the buffer specified for the flow of the input data, and
repeatedly performs, when the remaining amount information for the flow of the input data after the update takes a negative value, each operation of:
updating the specific information to information for specifying a next buffer, and
subsequent to the updating for the next buffer, adding the maximum amount information of the flow of input data to remaining amount information of the flow of input data until the remaining amount information of the flow of input data takes a positive value.

* * * * *